US012601385B2

(12) United States Patent
Truitt et al.

(10) Patent No.: US 12,601,385 B2
(45) Date of Patent: Apr. 14, 2026

(54) SHOCK ABSORBER

(71) Applicant: Hitachi Astemo, Ltd., Ibaraki (JP)

(72) Inventors: Jordan Truitt, Farmington Hills, MI
(US); Sean Lundberg, Dearborn
Heights, MI (US); Yohei Katayama,
Hitachinaka (JP); Takashi Tsukahara,
Hitachinaka (JP); **Shivanand
Sankaran**, Canton, MI (US)

(73) Assignee: HITACHI ASTEMO, LTD., Ibaraki
(JP)

( * ) Notice: Subject to any disclaimer, the term of this
patent is extended or adjusted under 35
U.S.C. 154(b) by 331 days.

(21) Appl. No.: 18/121,649

(22) Filed: Mar. 15, 2023

(65) Prior Publication Data

US 2024/0309933 A1     Sep. 19, 2024

(51) Int. Cl.
*F16F 9/49*          (2006.01)
*F16F 9/32*          (2006.01)
*F16F 9/348*         (2006.01)
*F16F 9/516*         (2006.01)

(52) U.S. Cl.
CPC ............ *F16F 9/516* (2013.01); *F16F 9/3235*
(2013.01); *F16F 9/3481* (2013.01); *F16F 9/49*
(2013.01); *F16F 2232/08* (2013.01)

(58) Field of Classification Search
CPC ................ F16F 9/48; F16F 9/49; F16F 9/585
See application file for complete search history.

(56) References Cited

U.S. PATENT DOCUMENTS 2,783,859 A * 3/1957 Patriquin .................. F16F 9/49
188/315
2,907,414 A * 10/1959 Patriquin .................. F16F 9/49
188/317

(Continued)

FOREIGN PATENT DOCUMENTS

JP          3-102633 U      10/1991
KR    10-2010-0089982 A     8/2010

OTHER PUBLICATIONS

International Search Report received in corresponding International
Application No. PCT/JP2024/006534 dated Apr. 16, 2024.

(Continued)

*Primary Examiner* — Bradley T King
(74) *Attorney, Agent, or Firm* — MATTINGLY &
MALUR, PC

(57)          ABSTRACT
This shock absorber includes a tube, a piston rod having one
end portion in an axial direction disposed in the tube and the
other end portion in the axial direction disposed outside the
tube, a piston assembly connected to an intermediate posi-
tion of the piston rod in the axial direction, dividing an inner
chamber into a first chamber on the other end portion side of
the piston rod and a second chamber on the one end portion
side of the piston rod, and configured to generate a damping
force when the piston rod moves, and a damping force
increasing mechanism increasing the damping force when
the piston assembly moves to the second chamber side. The
damping force increasing mechanism includes a first cylin-
der connected to the one end portion side of the piston rod
with respect to the piston assembly, and a partition piston
entering inside of the first cylinder.

4 Claims, 13 Drawing Sheets

(56) References Cited

U.S. PATENT DOCUMENTS

| | | | | |
|---|---|---|---|---|
| 3,036,669 A * | 5/1962 | Schultze | ................... | F16F 9/49 |
| | | | | 188/289 |
| 3,150,747 A * | 9/1964 | Bliven | ..................... | F16F 9/49 |
| | | | | 188/315 |
| 3,447,644 A * | 6/1969 | Duckett | .................... | F16F 9/48 |
| | | | | 188/315 |
| 10,107,352 B2 | 10/2018 | Grzesik et al. | | |
| 2001/0025753 A1 * | 10/2001 | Pfundstein | ................ | F16F 9/49 |
| | | | | 188/280 |
| 2016/0025174 A1 * | 1/2016 | Lizarraga Senar | ... | F16F 9/3214 |
| | | | | 188/315 |
| 2017/0328439 A1 * | 11/2017 | Flacht | ................... | F16F 9/3214 |
| 2018/0119770 A1 * | 5/2018 | Bruno | ..................... | F16F 9/516 |
| 2020/0141466 A1 * | 5/2020 | Miyata | ..................... | F16F 9/49 |
| 2021/0123495 A1 * | 4/2021 | Sankaran | ................. | F16F 9/185 |
| 2021/0180662 A1 * | 6/2021 | Lizarraga Senar | ....... | F16F 9/19 |
| 2023/0135744 A1 * | 5/2023 | Baek | ......................... | F16F 9/18 |
| | | | | 188/284 |
| 2024/0084872 A1 * | 3/2024 | Kropczynski | ........... | F16F 9/585 |
| 2024/0102530 A1 * | 3/2024 | Sankaran | ................. | F16F 9/348 |
| 2024/0309928 A1 * | 9/2024 | Schwedler | ............ | F16F 9/3214 |

OTHER PUBLICATIONS

Written Opinion of the International Searching Authority received in corresponding International Application No. PCT/JP2024/006534 dated Apr. 16, 2024.

Japanese Office Action received in corresponding Japanese Application No. 2025-506653 dated Mar. 3, 2026.

* cited by examiner

SHOCK ABSORBER

TECHNICAL FIELD

The present invention relates to a shock absorber.

BACKGROUND ART

There are shock absorbers in which a damping force increases when a piston rod reaches a predetermined range on a limit side during a compression stroke in which the piston rod is pushed into a tube (see, for example, U.S. Pat. No. 10,107,352). Incidentally, there has been a demand to curb increase in cost in shock absorbers.

Accordingly, an objective of the present invention is to provide a shock absorber in which increase in cost can be curbed.

Means for Solving the Problem

In order to achieve the above-described objective, one aspect of a shock absorber of the present invention includes a tube having an inner chamber inside, a piston rod having one end portion in an axial direction disposed in the tube and the other end portion in the axial direction disposed outside the tube, a piston assembly connected to an intermediate position of the piston rod in the axial direction, dividing the inner chamber into a first chamber on the other end portion side of the piston rod and a second chamber on the one end portion side of the piston rod, and configured to generate a damping force when the piston rod moves, and a damping force increasing mechanism increasing the damping force when the piston assembly moves to the second chamber side. The damping force increasing mechanism includes a first cylinder connected to the one end portion side of the piston rod with respect to the piston assembly, and a partition piston entering the inside of the first cylinder to form a partition chamber in the first cylinder when the piston assembly moves to the second chamber side.

Effects of the Invention

According to the above-described aspect of the present invention, it is possible to curb increase in cost.

DESCRIPTION OF EMBODIMENTS

First Embodiment

Figure 1:
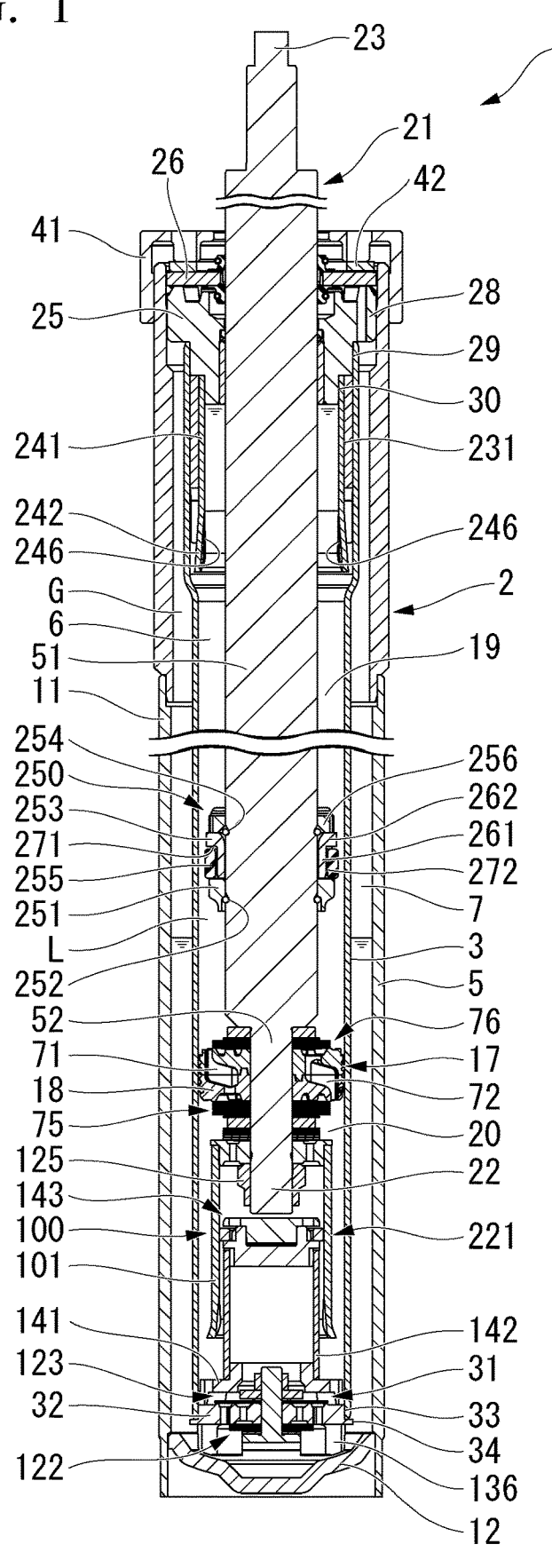
FIG. 1 is a cross-sectional view illustrating a shock absorber of a first embodiment according to the present invention.

A shock absorber of a first embodiment according to the present invention will be described on the basis of FIGS. 1 to 4. Hereinafter, for convenience of description, an upper side in the drawing will be referred to using "upper" and a lower side in the drawing will be referred to using "lower".

As illustrated in FIG. 1, a shock absorber 1 of the first embodiment is a dual-tube type hydraulic shock absorber. The shock absorber 1 is used in suspension devices of vehicles, specifically, automobiles. The shock absorber 1 includes a cylinder 2. The cylinder 2 includes a tube 3 and a shell 5. The tube 3 has a cylindrical shape. The shell 5 has a bottomed cylindrical shape. The shell 5 has an inner diameter larger than an outer diameter of the tube 3. The tube 3 is disposed inside of the shell 5 in the radial direction. A central axis of the tube 3 and a central axis of the shell 5 coincide with each other. The tube 3 has an inner chamber 6 inside. A reservoir chamber 7 is provided between the tube 3 and the shell 5.

The shell 5 includes a barrel member 11 and a bottom member 12. The barrel member 11 has a cylindrical shape. The bottom member 12 has a circular shape and is fitted to an inner side of a lower portion of the barrel member 11. An entire circumference of the bottom member 12 is joined to the barrel member 11 by welding or the like. The bottom member 12 closes the lower portion of the barrel member 11.

The shock absorber 1 includes a piston assembly 17. The piston assembly 17 is disposed in the tube 3 of the cylinder 2. The piston assembly 17 includes a piston 18. In the piston assembly 17, the piston 18 is fitted in the tube 3 to be slidable. The piston 18 divides the inner chamber 6 in the tube 3 into two chambers, a first chamber 19 on one side and a second chamber 20 on the other side. The first chamber 19 is on a side opposite to the bottom member 12 with respect to the piston 18 in an axial direction of the tube 3. The second chamber 20 is on the bottom member 12 side with respect to the piston 18 in the axial direction of the tube 3. In the cylinder 2, an oil fluid L as a working fluid is sealed in the inner chamber 6 inside the tube 3. In the cylinder 2, the oil fluid L and a gas G are sealed as working fluids in the reservoir chamber 7 between the tube 3 and the shell 5.

The shock absorber 1 includes a piston rod 21. In the piston rod 21, a first end portion 22 which is one end portion in an axial direction thereof is disposed in the tube 3 of the cylinder 2. In the piston rod 21, a second end portion 23 which is the other end portion in the axial direction thereof is disposed outside the cylinder 2. The piston assembly 17 is connected to the piston rod 21 at an intermediate position on a side closer to the first end portion 22 between the first end portion 22 and the second end portion 23 in the axial direction thereof. The piston rod 21 passes through the first chamber 19 and extends to the outside from the tube 3 and the shell 5, that is, the cylinder 2, with the piston assembly 17 connected thereto. The piston assembly 17 divides the inner chamber 6 into the first chamber 19 on the second end portion 23 side and the second chamber 20 on the first end portion 22 side in the axial direction of the piston rod 21.

In the shock absorber 1, a portion of the piston rod 21 extending from the cylinder 2 is disposed at an upper portion and is connected to a vehicle body. At the same time, in the shock absorber 1, the barrel member 11 of the shell 5 is disposed at a lower portion and is connected to a wheel side of the vehicle.

The piston 18 is fixed to the piston rod 21. Therefore, the piston 18 and the piston rod 21 move together. In the shock absorber 1, a stroke in which the piston rod 21 moves in a direction to increase an amount of extension thereof from the cylinder 2 is an extension stroke in which the entire length increases. In the shock absorber 1, a stroke in which the piston rod 21 moves in a direction to decrease an amount of extension thereof from the cylinder 2 is a compression stroke in which the entire length decreases. In the shock absorber 1, the piston 18 moves to the first chamber 19 side during the extension stroke. In the shock absorber 1, the piston 18 moves to the second chamber 20 side during the compression stroke.

A rod guide 25 is fitted to an upper end opening side of the tube 3 and an upper end opening side of the shell 5. A seal member 26 is fitted to the shell 5 on an upper side of the rod guide 25. Both the rod guide 25 and the seal member 26 are annular. The piston rod 21 is inserted through radially inside of the rod guide 25 and the seal member 26. The piston rod 21 slides with respect to the rod guide 25 and the seal member 26 in the axial direction. The piston rod 21 extends from the inside of the cylinder 2 to the outside of the cylinder 2 from the seal member 26.

The rod guide 25 restricts movement of the piston rod 21 in the radial direction with respect to the tube 3 and the shell 5 of the cylinder 2. The piston rod 21 is fitted in the rod guide 25 and the piston 18 is fitted in the tube 3. Thereby, a central axis of the piston rod 21 and a central axis of the tube 3 coincide with each other. The rod guide 25 supports the piston rod 21 to be movable in the axial direction of the piston rod 21. The seal member 26 has an outer circumferential portion in close contact with the shell 5. The seal member 26 has an inner circumferential portion in close contact with an outer circumferential portion of the piston rod 21. The piston rod 21 slides in the axial direction of the seal member 26 with respect to the seal member 26. The seal member 26 suppresses the oil fluid L in the tube 3 and the high-pressure gas G and the oil fluid L in the reservoir chamber 7 leaking out to the outside.

The rod guide 25 has a large diameter part 28, an intermediate diameter part 29, and a small diameter part 30 on an outer circumferential side thereof. The large diameter part 28 has an outer diameter larger than an outer diameter of the intermediate diameter part 29. The intermediate diameter part 29 has an outer diameter larger than an outer diameter of the small diameter part 30. In the rod guide 25, the intermediate diameter part 29 is provided on a side below the large diameter part 28. In the rod guide 25, the small diameter part 30 is provided on a side below the intermediate diameter part 29. The rod guide 25 is fitted to an inner circumferential portion of an upper end of the tube 3 at the intermediate diameter part 29. At that time, an upper end portion of the tube 3 comes in contact with the large diameter part 28 in the axial direction of the tube 3. The rod guide 25 is fitted to an upper inner circumferential portion of the barrel member 11 of the shell 5 at the large diameter part 28 on the upper side.

A body valve assembly 31 is placed on the bottom member 12 of the shell 5. The body valve assembly 31 is provided on a side of the second chamber 20 opposite to the piston assembly 17. The body valve assembly 31 includes a seat member 32. The seat member 32 is placed in contact with an upper surface of the bottom member 12 of the shell 5. The seat member 32 is positioned in the radial direction with respect to the shell 5. The seat member 32 has a large diameter part 33 and a small diameter part 34 on an outer circumferential portion in a radial direction thereof. The large diameter part 33 has an outer diameter larger than an outer diameter of the small diameter part 34. In the seat member 32, the large diameter part 33 is provided on a lower side of the small diameter part 34. The large diameter part 33 of the seat member 32 is placed on the upper surface of the bottom member 12. The seat member 32 is fitted to an inner circumferential portion of a lower end of the tube 3 at the small diameter part 34 on the upper side. At that time, a lower end portion of the tube 3 comes in contact with the large diameter part 33 in the axial direction of the tube 3. Thereby, the body valve assembly 31 is connected to one end of the tube 3 in the axial direction.

A cover 41 is attached to an upper end portion of the barrel member 11 of the shell 5. The cover 41 is fitted and fixed to the barrel member 11. A disc 42 is placed on the seal member 26, and the disc 42 and the seal member 26 are fixed to the cylinder 2 by being sandwiched between the cover 41 and the rod guide 25. When the cover 41 is attached, the disc 42 is pressed against the seal member 26 in the axial direction of the shell 5 while the bottom member 12 of the shell 5 is placed on a table. Then, the disc 42, the seal member 26, the rod guide 25, the tube 3, the seat member 32, and the bottom member 12 are in contact with each other without a gap therebetween in the axial direction. Thereby, an axial force is generated in the disc 42, the seal member 26, the rod guide 25, the tube 3, and the seat member 32. In this state, the cover 41 is fixed to the barrel member 11. Then, an axial force is generated in the disc 42, the seal member 26, the rod guide 25, the tube 3, and the seat member 32.

The piston rod 21 includes a main shaft part 51 and a mounting shaft part 52. Both the main shaft part 51 and the mounting shaft part 52 have a rod shape. The mounting shaft part 52 has an outer diameter smaller than an outer diameter of the main shaft part 51. The mounting shaft part 52 extends from one end of the main shaft part 51 in the axial direction. A central axis of the mounting shaft part 52 coincides with a central axis of the main shaft part 51. The mounting shaft part 52 is disposed in the tube 3 in its entirety. The main shaft part 51 of the piston rod 21 slides with respect to the rod guide 25 and the seal member 26 in the axial direction of them.

Figure 2:
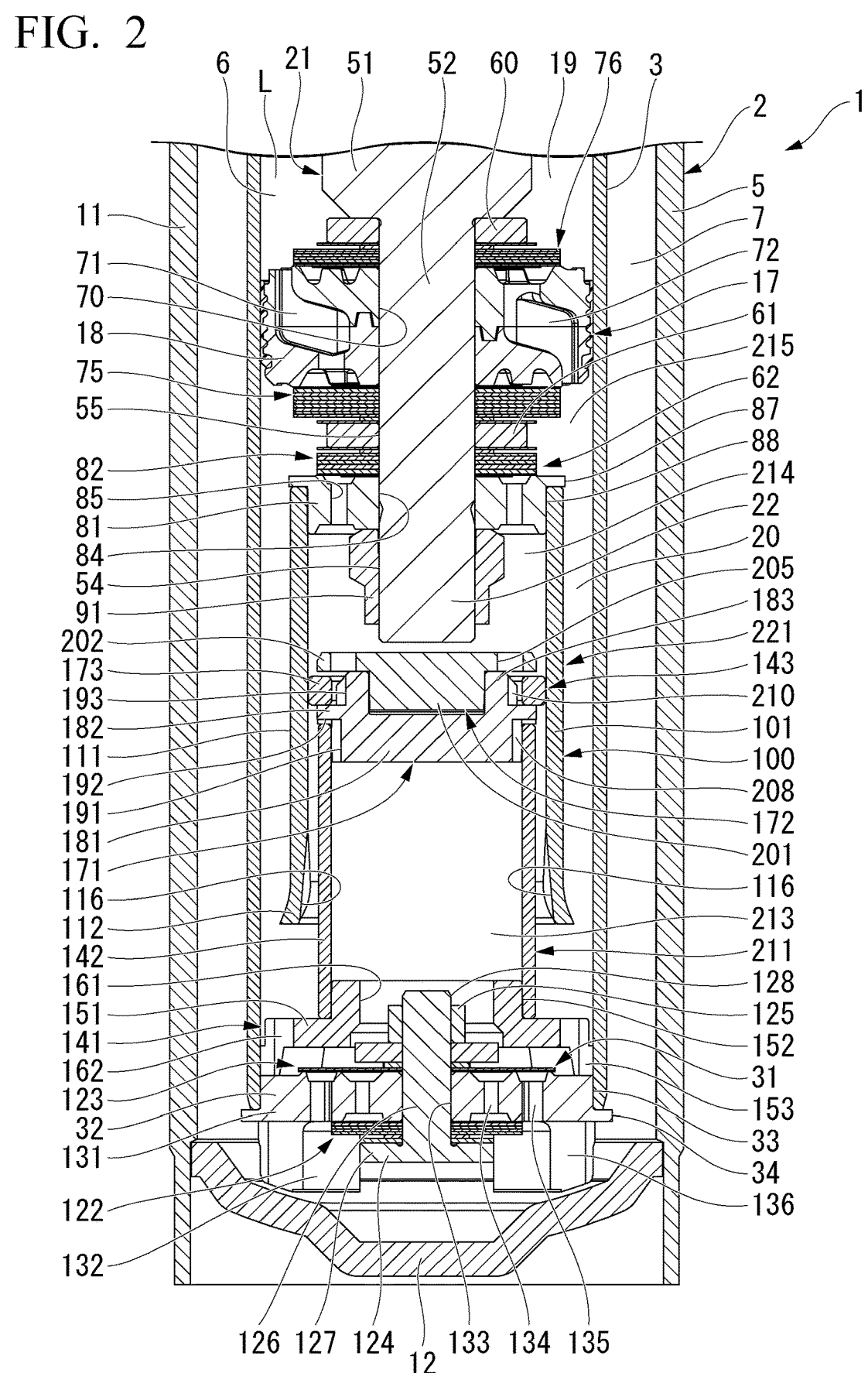
FIG. 2 is a cross-sectional view of a main part illustrating the shock absorber of the first embodiment according to the present invention.

As illustrated in FIG. 2, in the piston rod 21, an end portion of the mounting shaft part 52 on a side opposite to the main shaft part 51 in the axial direction is the first end portion 22. The first end portion 22 has a male screw 54 formed on an outer circumferential portion. A portion of the mounting shaft part 52 between the main shaft part 51 and the first end portion 22 in the axial direction of the mounting shaft part 52 is a fitting shaft part 55. An outer circumferential surface of the fitting shaft part 55 is a cylindrical surface.

The above-described piston assembly 17, an intervening member 60, an intervening member 61, and a relief valve assembly 62 (valve assembly) are connected to the mounting shaft part 52 of the piston rod 21.

A through hole 70 is formed at a center of the piston 18 of the piston assembly 17 in the radial direction. The through hole 70 penetrates the piston 18 in the axial direction of the piston 18. The fitting shaft part 55 of the piston rod 21 is fitted in the through hole 70 of the piston 18. The piston 18 includes a first passage 71 and a second passage 72 formed on an outer side of the through hole 70 in the radial direction of the piston 18. The first passage 71 and the second passage 72 penetrate the piston 18 in the axial direction of the piston 18. A plurality of first passages 71 and a plurality of second passages 72 are formed in the piston 18. The first passages 71 and the second passages 72 are alternately disposed in the circumferential direction of the piston 18. Both the first passages 71 and the second passages 72 allow communication between the first chamber 19 and the second chamber 20.

The piston assembly 17 includes a first damping valve 75 and a second damping valve 76.

The first damping valve 75 is a disc valve formed by laminating a plurality of annular discs. The fitting shaft part 55 of the piston rod 21 is fitted to an inner side of the first damping valve 75 in a radial direction thereof. The first damping valve 75 is disposed on a side of the piston 18 opposite to the main shaft part 51 in the axial direction of the piston rod 21. The first damping valve 75 opens the first passage 71 when a portion on an outer circumferential side thereof is separated from the piston 18 during the extension stroke in which the piston rod 21 moves to an extension side. Thereby, the first damping valve 75 allows the oil fluid L to flow from the first chamber 19 to the second chamber 20 through the first passage 71. At that time, the first damping valve 75 suppresses a flow of the oil fluid L to generate a damping force. The first damping valve 75 is provided in the first passage 71 to generate a damping force by suppressing the flow of the oil fluid L generated in the first passage 71 during the extension stroke. The first damping valve 75 closes the first passage 71 when the portion on the outer circumferential side comes in contact with the piston 18. A fixed orifice (not illustrated) is provided at a portion between the first damping valve 75 and the piston 18. The fixed orifice allows the oil fluid L to flow from the first chamber 19 to the second chamber 20 through the first passage 71 even if the portion on the outer circumferential side of the first damping valve 75 is in contact with the piston 18.

The second damping valve 76 is a disc valve formed by laminating a plurality of annular discs. The fitting shaft part 55 is fitted to an inner side of the second damping valve 76 in a radial direction thereof. The second damping valve 76 is disposed between the main shaft part 51 and the piston 18 in the axial direction of the piston rod 21. The second damping valve 76 opens the second passage 72 when a portion on an outer circumferential side thereof is separated from the piston 18 during the extension stroke in which the piston rod 21 moves to the extension side. Thereby, the second damping valve 76 allows the oil fluid L to flow from the second chamber 20 to the first chamber 19 through the second passage 72. At that time, the second damping valve

76 suppresses a flow of the oil fluid L to generate a damping force. The second damping valve 76 is provided in the second passage 72 to generate a damping force by suppressing the flow of the oil fluid L generated in the second passage 72 during the compression stroke. The second damping valve 76 closes the second passage 72 when the portion on the outer circumferential side comes in contact with the piston 18. A fixed orifice (not illustrated) is provided at a portion between the second damping valve 76 and the piston 18. The fixed orifice allows the oil fluid L to flow from the second chamber 20 to the first chamber 19 through the second passage 72 even if the portion on the outer circumferential side of the second damping valve 76 comes in contact with the piston 18.

The piston assembly 17 including the piston 18, the first damping valve 75, and the second damping valve 76 moves integrally with the piston rod 21 to generate a damping force when the piston rod 21 moves with respect to the tube 3 in the axial direction of the tube 3.

The intervening member 60 has an annular shape. The fitting shaft part 55 is fitted to an inner side of the intervening member 60 in a radial direction thereof. The intervening member 60 is disposed on a side of the second damping valve 76 opposite to the piston 18 in the axial direction of the piston rod 21. The intervening member 60 is in contact with the second damping valve 76. The intervening member 60 has a higher rigidity than the discs constituting the second damping valve 76. The intervening member 60 suppresses excessive deformation of the second damping valve 76.

The intervening member 61 has an annular shape. The fitting shaft part 55 is fitted to an inner side of the intervening member 61 in a radial direction thereof. The intervening member 61 is disposed on a side of the first damping valve 75 opposite to the piston 18 in the axial direction of the piston rod 21. The intervening member 61 is in contact with the first damping valve 75. The intervening member 61 has a higher rigidity than the discs constituting the first damping valve 75. The intervening member 61 suppresses excessive deformation of the first damping valve 75.

The relief valve assembly 62 includes a support piston 81 and a relief valve 82.

A through hole 84 is formed at a center of the support piston 81 in the radial direction thereof. The through hole 84 penetrates the support piston 81 in the axial direction of the support piston 81. The fitting shaft part 55 of the piston rod 21 is fitted in the through hole 84 of the support piston 81. A passage hole 85 is formed in the support piston 81 on a side outward from the through hole 84 in the radial direction of the support piston 81. The passage hole 85 penetrates the support piston 81 in the axial direction of the support piston 81. A plurality of passage holes 85 are formed in the support piston 81. The plurality of passage holes 85 are disposed at intervals in the circumferential direction of the support piston 81.

The support piston 81 has a large diameter part 87 and a small diameter part 88 at an outer circumferential portion thereof. The large diameter part 87 has an outer diameter larger than an outer diameter of the small diameter part 88. In the support piston 81, the small diameter part 88 is provided on a side below the large diameter part 87.

The relief valve 82 is a disc valve formed by laminating a plurality of annular discs. The fitting shaft part 55 of the piston rod 21 is fitted to an inner side of the relief valve 82 in a radial direction thereof. The relief valve 82 is disposed between the intervening member 61 and the support piston 81 in the axial direction of the piston rod 21. The relief valve 82 closes passages in the plurality of passage holes 85 when a portion on the outer circumferential side comes in contact with the support piston 81. The relief valve 82 opens the passages in the plurality of passage holes 85 when the portion on the outer circumferential side is separated from the support piston 81. The intervening member 61 is in contact with the relief valve 82. The intervening member 61 has a higher rigidity than the discs constituting the relief valve 82. The intervening member 61 suppresses excessive deformation of the relief valve 82.

The first end portion 22 of the piston rod 21 protrudes from the support piston 81 to a side of the piston rod 21 opposite to the relief valve 82 in the axial direction. Then, a nut 91 is screwed onto the male screw 54 formed on an outer circumferential portion of the first end portion 22. Thereby, the intervening member 60, the second damping valve 76, the piston 18, the first damping valve 75, the intervening member 61, the relief valve 82, and the support piston 81 are axially clamped by the main shaft part 51 and the nut 91 at least at their inner circumferential sides.

The relief valve assembly 62 including the support piston 81 and the relief valve 82 is attached to the mounting shaft part 52 of the piston rod 21 with the nut 91. Therefore, the relief valve assembly 62 is provided on the body valve assembly 31 side with respect to the piston assembly 17 of the piston rod 21. The support piston 81 is fixed to the piston rod 21.

The relief valve assembly 62 is connected to the first end portion 22 side of the piston rod 21 with respect to the piston assembly 17. The relief valve assembly 62 includes the support piston 81 connected to the first end portion 22 side of the piston rod 21 relative to the piston assembly 17, and the relief valve 82 formed of plate-shaped discs provided in contact with the support piston 81.

A first cylinder 101 is connected to the support piston 81. The support piston 81 and the first cylinder 101 constitute a bottomed cylindrical cup 100. The cup 100 moves together with the piston rod 21.

The first cylinder 101 has a cylindrical shape. The first cylinder 101 has an outer diameter smaller than an inner diameter of the tube 3. The first cylinder 101 is disposed inside of the tube 3 in the radial direction. The small diameter part 88 at a lower portion of the support piston 81 is press-fitted to an inner circumferential portion at an upper end of the first cylinder 101. Thereby, the first cylinder 101 is fixed to the support piston 81. At that time, an upper end portion of the first cylinder 101 is in contact with the large diameter part 87 of the support piston 81 in the axial direction. Also, at that time, a central axis of the first cylinder 101 coincides with the central axis of the tube 3. The first cylinder 101 is disposed in the second chamber 20 with a radial gap formed between itself and the tube 3. The first cylinder 101 is supported by the support piston 81.

The first cylinder 101 has a main body part 111 and an enlarged diameter part 112.

The main body part 111 has a cylindrical shape with a constant inner diameter and a constant outer diameter, and is provided from one end portion to an intermediate portion of the first cylinder 101 in the axial direction. One end portion of the first cylinder 101 in the axial direction of the main body part 111 is fitted to the small diameter part 88 of the support piston 81. The other end portion of the first cylinder 101 from the intermediate portion in the axial direction of the main body part 111 extends downward from the support piston 81.

The enlarged diameter part 112 is provided at the other end portion, that is, a lower end portion, of the first cylinder 101 in the axial direction. An inner diameter of the enlarged diameter part 112 increases toward a lower end. An outer diameter of the enlarged diameter part 112 increases toward the lower end. The enlarged diameter part 112 increases in diameter in a direction away from the main body part 111 in the axial direction of the first cylinder 101.

A first cylinder 101 of the cup 100 opens downward. The first cylinder 101 has a groove 116 provided to extend in the axial direction of the first cylinder 101 at an inner circumferential portion on one end side thereof in the axial direction. The groove 116 is provided at an inner circumferential portion on a lower end side of the first cylinder 101. The groove 116 is recessed outward in the radial direction of the first cylinder 101 from an inner circumferential surface of the first cylinder 101. The groove 116 extends from the enlarged diameter part 112 to a lower portion of the main body part 111. A plurality of grooves 116 are provided in the first cylinder 101 at regular intervals in the circumferential direction of the first cylinder 101. The plurality of grooves 116 have different lengths from the lower end of the first cylinder 101. In other words, the plurality of grooves 116 have different lengths in the axial direction of the first cylinder 101.

The first cylinder 101 is connected to the first end portion 22 side of the piston rod 21 with respect to the piston assembly 17 via the support piston 81 of the relief valve assembly 62. The relief valve assembly 62 is disposed in the second chamber 20 and connected to the piston rod 21.

The body valve assembly 31 includes a disc valve 122, a disc valve 123, a bolt 124, and a nut 125 in addition to the seat member 32 described above. The bolt 124 has a shaft portion 126 and a head portion 127. The shaft portion 126 has an outer diameter smaller than an outer diameter of the head portion 127. The shaft portion 126 has a male screw 128 formed on an outer circumferential portion on a side opposite to the head portion 127 in an axial direction thereof.

The disc valve 122 is provided on a lower side of the seat member 32. The disc valve 123 is provided on an upper side of the seat member 32. The shaft portion 126 of the bolt 124 is inserted into the disc valve 122, the seat member 32, and the disc valve 123 from below. In this state, the nut 125 is screwed onto the male screw 128 of the bolt 124. Thereby, the bolt 124 and nut 125 attach the disc valve 122 and the disc valve 123 to the seat member 32.

The seat member 32 has an annular shape. The seat member 32 includes a base part 131 and a protruding part 132. The base part 131 has a disc shape. The base part 131 has a through hole 133 formed at a center thereof in the radial direction. The through hole 133 penetrates the base part 131 in the axial direction of the seat member 32. The shaft portion 126 of the bolt 124 is inserted through the through hole 133 of the seat member 32. A passage hole 134 and a passage hole 135 are formed in the seat member 32 on an outer side of the through hole 133 in the radial direction of the seat member 32. The passage hole 134 and the passage hole 135 penetrate the base part 131 in the axial direction of the seat member 32. The passage hole 135 is on an outer side of the passage hole 134 in the radial direction of the seat member 32. A plurality of passage holes 134 and a plurality of passage holes 135 are formed in the seat member 32 at intervals in the circumferential direction.

The protruding part 132 protrudes downward from an outer circumferential portion of the base part 131. The protruding part 132 is disposed on an outer side of the passage hole 135 in the radial direction of the base part 131. The seat member 32 is in contact with the bottom member 12 of the shell 5 at the protruding part 132. The protruding part 132 has a passage groove 136 formed to penetrate the protruding part 132 in the radial direction of the seat member 32. A plurality of passage grooves 136 are provided in the seat member 32 at regular intervals in the circumferential direction of the seat member 32. Thereby, a space between the seat member 32 and the bottom member 12 of the shell 5 communicates with a portion between the barrel member 11 of the shell 5 and the tube 3. The space between the seat member 32 and the bottom member 12 of the shell 5 also constitutes the reservoir chamber 7. The seat member 32 divides the second chamber 20 and the reservoir chamber 7 from each other.

The shock absorber 1 includes a base adapter 141, a second cylinder 142 (support member), and a partition piston 143.

The base adapter 141 has an annular shape. The base adapter 141 includes a main plate part 151, a press-fitting part 152, and a leg part 153.

The main plate part 151 has a disc shape. The press-fitting part 152 is provided at one end of the base adapter 141 in the axial direction. The press-fitting part 152 protrudes upward from an upper surface of the main plate part 151. The press-fitting part 152 has a cylindrical shape. The press-fitting part 152 has an outer diameter smaller than an outer diameter of the main plate part 151. The main plate part 151 and the press-fitting part 152 include a through hole 161 formed to penetrate them in the axial direction at central portions thereof in the radial direction. Therefore, the main plate part 151 has a bored disc shape, and the press-fitting part 152 has a cylindrical shape.

The leg part 153 is provided at an end portion on a side opposite to the press-fitting part 152 in the axial direction of the base adapter 141. The leg part 153 protrudes downward from a lower surface of an outer circumferential portion of the main plate part 151. The leg part 153 has a cylindrical shape. The leg part 153 is disposed on an outer side of the through hole 161 in the radial direction of the main plate part 151. An inner circumferential portion on a radially inner side of the leg part 153 increases in diameter with distance away from the main plate part 151 in the axial direction of the base adapter 141. In other words, the inner circumferential portion of the leg part 153 increases in diameter with distance away from the main plate part 151 in the axial direction.

Figure 3:
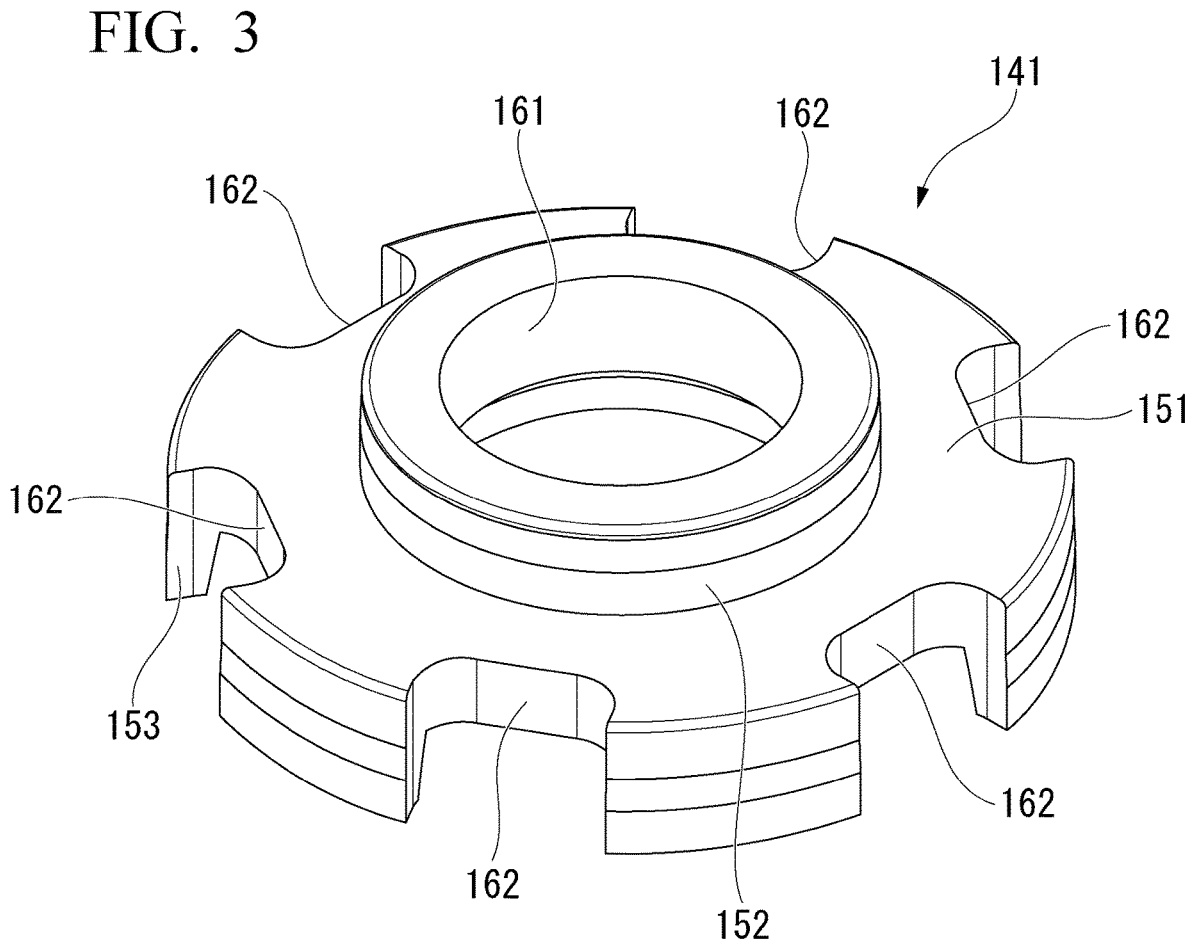
FIG. 3 is a perspective view illustrating a base adapter of the shock absorber of the first embodiment according to the present invention.

A communication groove 162 penetrating the main plate part 151 and the leg part 153 in the axial direction of the base adapter 141 is formed in the outer circumferential portion of the main plate part 151 and the leg part 153. As illustrated in FIG. 3, the communication groove 162 opens outward in the radial direction of the base adapter 141. The communication groove 162 penetrates the leg part 153 in the radial direction of the base adapter 141. Therefore, the communication groove 162 opens to the upper surface of the main plate part 151, an outer circumferential surface of the main plate part 151, an outer circumferential surface of the leg part 153, a lower surface of the leg part 153, and an inner circumferential surface of the leg part 153. A plurality of communication grooves 162 are provided in the base adapter 141 at regular intervals in the circumferential direction of the base adapter 141.

As illustrated in FIG. 2, the base adapter 141 is fixed by press-fitting the leg part 153 into the inner circumferential portion of the tube 3. At that time, a lower end portion of the leg part 153 of the base adapter 141 comes in contact with an upper surface of the outer circumferential portion of the base part 131 of the seat member 32. Also, at that time, the base adapter 141 hitting the bolt 124 and the nut 125 of the body valve assembly 31 is avoided by the through hole 161. Also, at that time, the leg part 153 of the base adapter 141 surrounds the disc valve 123 of the body valve assembly 31 from an outer side in the radial direction. In other words, the leg part 153 is disposed to be spaced apart from the disc valve 123 toward an outer side in the radial direction of the disc valve 123. The base adapter 141 in contact with the body valve assembly 31 is provided between the first cylinder 101 and the body valve assembly 31. The base adapter 141 is supported by the body valve assembly 31 in the axial direction and is supported by the tube 3 in the radial direction.

The second cylinder 142 has a cylindrical shape. The second cylinder 142 has an outer diameter smaller than an inner diameter of the main body part 111 of the first cylinder 101. The press-fitting part 152 of the base adapter 141 is press-fitted into an inner circumferential portion of the lower end portion of the second cylinder 142. At that time, the upper surface of the main plate part 151 comes in contact with the lower end portion of the second cylinder 142. Thereby, the second cylinder 142 is fixed to the base adapter 141. In this way, the second cylinder 142 is press-fitted into the base adapter 141 to be fixed. The second cylinder 142 extends from the base adapter 141 to a side opposite to the body valve assembly 31 in the axial direction of the base adapter 141. The base adapter 141 and the second cylinder 142 are provided in the second chamber 20. The second cylinder 142 is supported by the base adapter 141 in the radial direction and is supported by the body valve assembly 31 via the base adapter 141 in the axial direction. The communication groove 162 of the base adapter 141 is formed on an outer side of the main plate part 151 in the radial direction with respect to the second cylinder 142.

As described above, the press-fitting part 152 that is press-fitted into the second cylinder 142 is provided at one end of the base adapter 141 in the axial direction. A leg part 153 that is mounted on the body valve assembly 31 is provided at the other end of the base adapter 141 in the axial direction. The inner circumferential portion of the leg part 153 increases in diameter toward the body valve assembly 31 in the axial direction of the base adapter 141.

The partition piston 143 is attached to an end portion of the second cylinder 142 on a side opposite to the base adapter 141 in the axial direction, that is, to an upper end portion of the second cylinder 142.

The partition piston 143 includes a base member 171, a locking member 172, and a movable ring 173 (movable member).

The base member 171 includes a main body part 181, a flange part 182, and a cylindrical part 183.

The main body part 181 has a columnar shape.

The flange part 182 extends outward in the radial direction of the main body part 181 from one end side of the main body part 181 in the axial direction. The flange part 182 has an annular shape extending over the entire circumference of the main body part 181. The flange part 182 has an outer diameter smaller than an inner diameter of the main body part 111 of the first cylinder 101.

An axial groove 191 extending in the axial direction of the main body part 181 is formed at an outer circumferential portion of a portion of the main body part 181 excluding the flange part 182. A plurality of axial grooves 191 are formed in the main body part 181 at intervals in the circumferential direction thereof.

A radial groove 192 penetrating the flange part 182 in the radial direction of the flange part 182 is formed in the flange part 182 on the axial groove 191 side in the axial direction thereof. A plurality of radial grooves 192 are formed in the flange part 182 at intervals in the circumferential direction thereof. The same number of radial grooves 192 as the number of axial grooves 191 of the main body part 181 is formed in the flange part 182. The plurality of radial grooves 192 are each in phase with the corresponding axial groove 191 in the circumferential direction of the base member 171.

The cylindrical part 183 has a cylindrical shape whose outer diameter is smaller than an outer diameter of the flange part 182. An axial groove 193 extending in the axial direction is formed at an outer circumferential portion of the cylindrical part 183. A plurality of axial grooves 193 are formed in the cylindrical part 183 at intervals in the circumferential direction thereof. In the axial direction of the cylindrical part 183, the axial groove 193 is formed to extend from an end portion of the cylindrical part 183 on the flange part 182 side in the axial direction to a side opposite to the flange part 182.

The locking member 172 includes a fitting part 201 and a flange part 202.

The fitting part 201 has a columnar shape.

The flange part 202 extends outward in the radial direction of the fitting part 201 from one end side of the fitting part 201 in the axial direction. The flange part 202 has an annular shape extending over the entire circumference of the fitting part 201. The flange part 202 has an outer diameter smaller than an inner diameter of the main body part 111 of the first cylinder 101. A passage hole 205 penetrating the flange part 202 in the axial direction of the flange part 202 is formed in the flange part 202. A plurality of passage holes 205 are formed in the flange part 202 at intervals in the circumferential direction thereof.

The movable ring 173 has an annular shape. The movable ring 173 has a portion that is broken in the circumferential direction to form a circumferential gap, and this allows the movable ring 173 to expand and contract in the radial direction. An inner diameter of the movable ring 173 in a natural state is smaller than the outer diameter of the flange part 182 of the base member 171 and an outer diameter of the flange part 202 of the locking member 172. An outer diameter of the movable ring 173 in a natural state is equal to or smaller than a maximum inner diameter of the enlarged diameter part 112 of the first cylinder 101 and is larger than the inner diameter of the main body part 111. When the movable ring 173 is contracted in diameter, an outer diameter thereof is equal to the inner diameter of the main body part 111 of the first cylinder 101. The inner diameter of the movable ring 173 in this state is larger than the outer diameter of the cylindrical part 183 of the base member 171. Also, even in this state, the circumferential gap of the movable ring 173 does not reduce to zero in size. The movable ring 173 has an axial length smaller than an axial length of the cylindrical part 183 of the base member 171.

The base member 171 of the partition piston 143 is fitted into an inner circumferential portion of the upper end portion of the second cylinder 142 at the main body part 181 to be fixed to the second cylinder 142. In other words, the base member 171 is fixed to the second cylinder 142 by fitting the main body part 181 thereof to the inner circumferential portion of the second cylinder 142 on a side opposite to the base adapter 141 in the axial direction. At that time, the flange part 182 of the base member 171 comes into contact with the second cylinder 142 in the axial direction of the base member 171. In the base member 171 fixed to the second cylinder 142 in this way, the axial groove 191 and the radial groove 192 form a communication passage 208 that allows a radially inner side of the second cylinder 142 to communicate with a radially outer side thereof.

The movable ring 173 of the partition piston 143 is mounted on an upper side of the flange part 182 of the base member 171 that is in a state of being fixed to the second cylinder 142 as described above. In other words, the movable ring 173 is disposed on a side of the flange part 182 opposite to the second cylinder 142 in the axial direction. At that time, the cylindrical part 183 of the base member 171 is inserted into a radially inner side of the movable ring 173.

The partition piston 143 is fixed to the base member 171 when the locking member 172 is press-fitted into an inner circumferential portion of the cylindrical part 183 of the base member 171 at the fitting part 201. At this time, the flange part 202 of the locking member 172 comes into contact with an end portion of the base member 171 on a side opposite to the flange part 182 in the axial direction of the cylindrical part 183. In this state, the flange part 202 of the locking member 172 restricts the movable ring 173 coming off from the cylindrical part 183. Thereby, the movable ring 173 is sandwiched between the flange part 182 of the base member 171 and the flange part 202 of the locking member 172 in the axial direction.

The movable ring 173 is movable in the axial direction between the flange parts 182 and 202. When the movable ring 173 is separated from the flange part 182 in the axial direction, a passage 210, which is formed of passages in the plurality of passage holes 205 of the locking member 172, a passage between the movable ring 173 and the cylindrical part 183 of the base member 171, passages in the plurality of axial grooves 193 of the cylindrical part 183, and a passage between the movable ring 173 and the flange part 182, opens. The movable ring 173 closes the passage 210 when it comes into contact with the flange part 182 in the axial direction.

The partition piston 143 is supported by the bottom member 12 of the tube 3 via the second cylinder 142, the base adapter 141, and the seat member 32 of the body valve assembly 31. In other words, the second cylinder 142 having a smaller diameter than the first cylinder 101 is provided above the body valve assembly 31 via the base adapter 141 to support the partition piston 143. The second cylinder 142 and the base adapter 141 constitute a partition piston support body 211 mounted on the body valve assembly 31 to support the partition piston 143. The partition piston 143 and the partition piston support body 211 are provided in the second chamber 20.

A portion surrounded by the body valve assembly 31, the base adapter 141, the second cylinder 142, and the partition piston 143 is a second cylinder inner chamber 213. The second cylinder inner chamber 213 communicates with a portion between the tube 3 of the second chamber 20 and the first cylinder 101 and a portion between the tube 3 of the second chamber 20 and the second cylinder 142 via a passage in the communication groove 162 of the base adapter 141. The second cylinder inner chamber 213 forms a part of the second chamber 20. In other words, the communication groove 162 forming the second cylinder inner chamber 213, which is a part of the second chamber 20, in the second cylinder 142 is provided in the main plate part 151 and the leg part 153 of the base adapter 141. The communication passage 208 between the partition piston 143 and the second cylinder 142 allows the second cylinder inner chamber 213 in the second cylinder 142 to communicate with the outside of the second cylinder 142. If there is air in the second cylinder inner chamber 213 in the second cylinder 142, the communication passage 208 can cause the air to flow to the outside of the second cylinder 142.

In the body valve assembly 31, the plurality of passage holes 134 allow the oil fluid L to flow between the second chamber 20 including the second cylinder inner chamber 213 and the reservoir chamber 7. In the body valve assembly 31, the plurality of passage holes 135 allow the oil fluid L to flow between the reservoir chamber 7 and the second chamber 20 including the second cylinder inner chamber 213.

The disc valve 122 on the reservoir chamber 7 side allows the oil fluid L to flow from the second chamber 20 including the second cylinder inner chamber 213 to the reservoir chamber 7 through the passage holes 134. On the other hand, the disc valve 122 restricts a flow of the oil fluid L from the reservoir chamber 7 to the second chamber 20 through the passage holes 134. The disc valve 122 opens during the compression stroke of the shock absorber 1 to allow the oil fluid L to flow mainly from the second chamber 20 to the reservoir chamber 7 and generate a damping force.

The disc valve 123 on the second cylinder inner chamber 213 side allows the oil fluid L to flow from the reservoir chamber 7 to the second chamber 20 through the passage holes 135. On the other hand, the disc valve 123 restricts a flow of the oil fluid L from the second chamber 20 to the reservoir chamber 7 through the passage holes 135. The disc valve 123 allows constant communication between the second chamber 20 and the passage holes 134. The disc valve 123 opens during the extension stroke of the shock absorber 1 to allow the oil fluid L to flow from the reservoir chamber 7 to the second chamber 20 and generate a damping force. Further, the disc valve 123 may be used as a suction valve that allows the oil fluid L to flow from the reservoir chamber 7 to the second chamber 20 substantially without generating a damping force.

The partition piston 143 enters from below and exits downward with respect to the first cylinder 101 through an opening at the lower end of the first cylinder 101.

Here, when the piston rod 21 is in a first predetermined range in which the cup 100 including the first cylinder 101 is disposed on an upper side of the partition piston 143 and the cup 100 is not yet fitted to the partition piston 143, the inside of the cup 100 serves as the second chamber 20 as a whole.

From this state, in the compression stroke, the piston rod 21 moves to a second predetermined range on the base adapter 141 side with respect to the first predetermined range. Then, the cup 100, which moves integrally with the piston rod 21, covers the partition piston 143 to cause the movable ring 173 of the partition piston 143 to enter the inside of the enlarged diameter part 112 of the first cylinder 101, and then cause the movable ring 173 to be fitted into the main body part 111 of the first cylinder 101. At the beginning of the fitting, the movable ring 173 is pressed against the flange part 182 of the base member 171 by a frictional force with the first cylinder 101 that comes in contact therewith, thereby closing the passage 210 as illustrated in FIG. 2. In the subsequent compression stroke, the movable ring 173 slides inside the first cylinder 101 to approach the support piston 81 while maintaining the state of being pressed against the flange part 182 and closing the passage 210 as described above.

When the first cylinder 101 is fitted to the movable ring 173 of the partition piston 143, the second chamber 20 is divided into a first cylinder inner chamber 214 (partition chamber) inside the first cylinder 101 and a cylinder outer chamber 215 outside the first cylinder 101. The first cylinder inner chamber 214 is a portion inside the first cylinder 101 between the relief valve assembly 62 and the partition piston

143. The cylinder outer chamber 215 is a portion of the second chamber 20 excluding the first cylinder inner chamber 214. The cylinder outer chamber 215 includes a portion between the cup 100 and the tube 3, a portion between the second cylinder 142 and the tube 3, a portion between the first cylinder 101 and the second cylinder 142, and the second cylinder inner chamber 213. The passage 210 of the partition piston 143 is a passage that allows communication between the cylinder outer chamber 215 and the first cylinder inner chamber 214, and the movable ring 173 can open and close the passage 210.

During the compression stroke in the second predetermined range, the cup 100 moves to the base adapter 141 side together with the piston rod 21 while the movable ring 173 is brought into contact with the flange part 182 and closes the passage 210 as described above. At an upper portion of the second predetermined range, the movable ring 173 is at a position of the plurality of grooves 116 provided in the first cylinder 101 to allow the oil fluid L to flow from the first cylinder inner chamber 214 to the cylinder outer chamber 215 through passages in the plurality of grooves 116. At that time, as the cup 100 approaches the base adapter 141, among the plurality of grooves 116, the number of the grooves 116 that allow the oil fluid L to flow from the first cylinder inner chamber 214 to the cylinder outer chamber 215 decreases and finally becomes zero. Thereby, the cup 100 including the first cylinder 101, and the partition piston 143 increase the damping force in stages. In the subsequent compression stroke, the movable ring 173 slides in the first cylinder 101 to approach the support piston 81 while being fitted to the main body part 111 and closing the passage 210 to the maximum. In other words, the movable ring 173 closes the passage 210 when the piston assembly 17 moves to the second chamber 20 side.

The relief valve assembly 62, the first cylinder 101 connected to the relief valve assembly 62, and the partition piston 143 constitute a damping force increasing mechanism 221 that increases the damping force in addition to the damping force generated by the piston assembly 17 when the piston assembly 17 moves to the second chamber 20 side. In other words, the damping force increasing mechanism 221 includes the relief valve assembly 62 connected to the first end portion 22 side of the piston rod 21 with respect to the piston assembly 17, and the first cylinder 101 is connected to the relief valve assembly 62. The damping force increasing mechanism 221 includes the first cylinder 101 connected to the first end portion 22 side of the piston rod 21 with respect to the piston assembly 17, and the partition piston 143 that enters the inside of the first cylinder 101 to form the first cylinder inner chamber 214 in the first cylinder 101 when the piston assembly 17 moves to the second chamber 20 side.

Also, in the compression stroke in the second predetermined range, the cup 100 moves to the base adapter 141 side while the partition piston 143 closes the passage 210 as described above. At that time, the relief valve 82 opens depending on a piston speed which is a moving speed of the piston rod 21, the piston 18, and the support piston 81 with respect to the tube 3. Then, the oil fluid L flows from the first cylinder inner chamber 214 to the cylinder outer chamber 215 through the passages in the plurality of passage holes 85. Thereby, the relief valve 82 suppresses an excessive increase in pressure in the first cylinder inner chamber 214. The relief valve 82 allows the oil fluid L to flow from the first cylinder inner chamber 214 to the cylinder outer chamber 215 while generating a damping force by suppressing a flow of the oil fluid L through the passages in the plurality of passage holes 85 that occurs during the compression stroke. Here, the relief valve 82 has higher rigidity than the second damping valve 76 and is difficult to open. Therefore, the relief valve 82 opens later than the second damping valve 76 and generates a higher damping force than the second damping valve 76.

Figure 4:
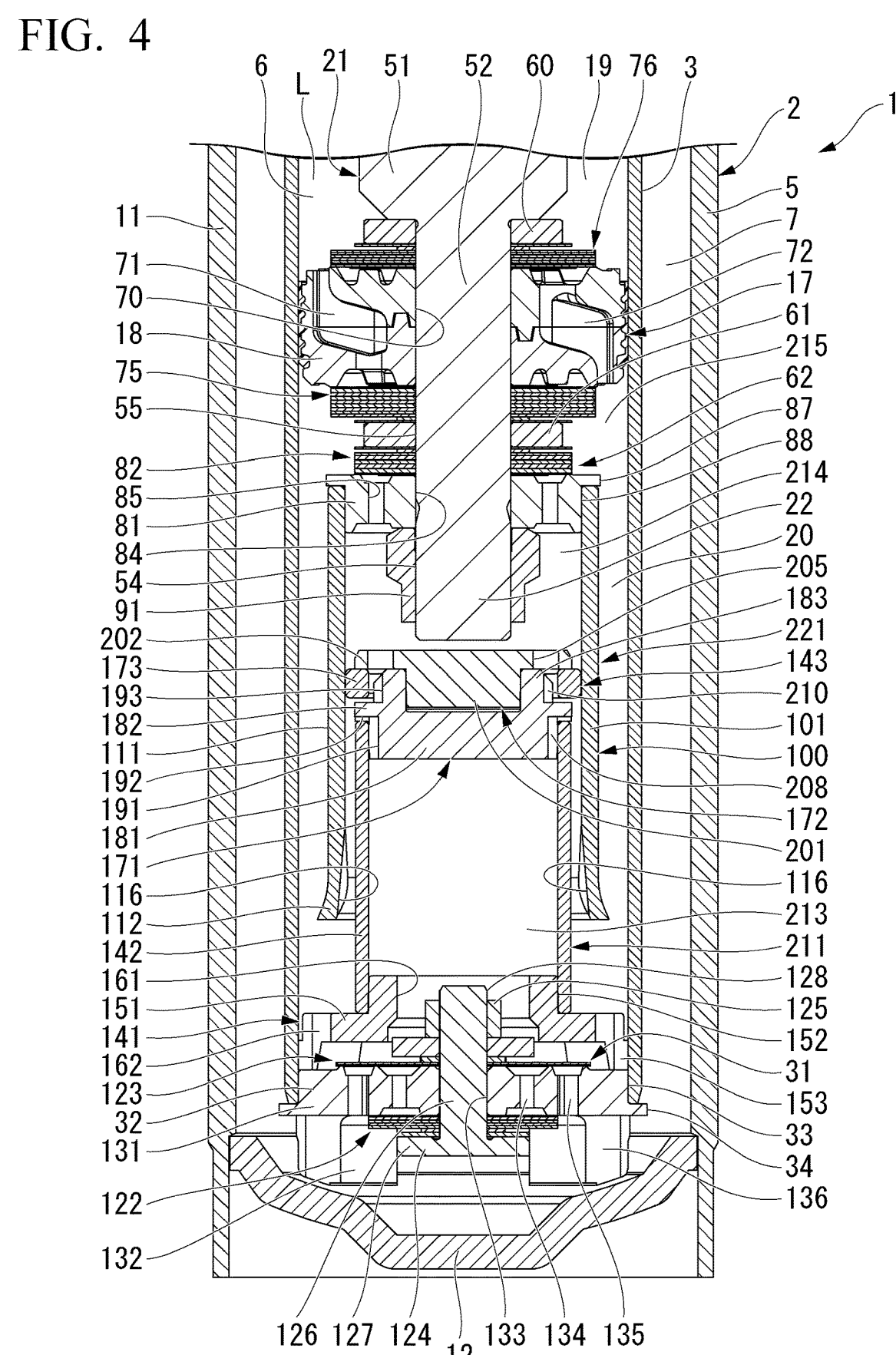
FIG. 4 is a cross-sectional view of a main part illustrating the shock absorber of the first embodiment according to the present invention.

During the extension stroke in the second predetermined range, the cup 100, together with the piston rod 21, moves in a direction away from the base adapter 141. Then, the movable ring 173 of the partition piston 143 is separated from the flange part 182 in the axial direction by the frictional force with the first cylinder 101 and comes into contact with the flange part 202, thereby opening the passage 210 as illustrated in FIG. 4. In other words, the movable ring 173 opens the passage 210 when the piston assembly 17 moves to the first chamber 19 side. In the subsequent extension stroke, the cup 100 moves in a direction away from the base adapter 141 while the passage 210 remains open due to the movable ring 173. When the cup 100 moves in a direction away from the base adapter 141, the oil fluid L is allowed to flow from the portion of the cylinder outer chamber 215 between the first cylinder 101 and the second cylinder 142 to the first cylinder inner chamber 214 through the passage 210. Thereby, the damping force on the movement of the piston rod 21 in the extension direction is reduced.

In the extension stroke from a state in which the movable ring 173 is on the support piston 81 side with respect to all the grooves 116 in the first cylinder 101, when the cup 100 separates the support piston 81 from the movable ring 173 by a predetermined distance, the movable ring 173 is positioned at a position of the grooves 116 provided in the first cylinder 101 to open the grooves 116 to the first cylinder inner chamber 214. Then, in addition to the flow through the passage 210, the oil fluid L flows from the cylinder outer chamber 215 to the first cylinder inner chamber 214 through the passages in the grooves 116 to reduce the damping force on the movement of the piston rod 21 in the extension direction. At that time, as the cup 100 becomes further away from the base adapter 141, among the plurality of grooves 116, the number of the grooves 116 that allow the oil fluid L to flow from the cylinder outer chamber 215 to the first cylinder inner chamber 214 increases. As a result, the damping force on the movement of the piston rod 21 in the extension direction is reduced in stages.

As illustrated in FIG. 1, a third cylinder 231 is connected to the small diameter part 30 of the rod guide 25. The third cylinder 231 has a cylindrical shape. The third cylinder 231 is disposed inside of the tube 3 in the radial direction. The third cylinder 231 is fixed to the rod guide 25 by fitting an inner circumferential portion of an upper end thereof to the small diameter part 30 of the rod guide 25. At that time, the upper end portion of the third cylinder 231 comes into contact with the intermediate diameter part 29 of the rod guide 25 in the axial direction. Also, at that time, a central axis of the third cylinder 231 coincides with the central axis of the tube 3. The third cylinder 231 is disposed in the first chamber 19 with a radial gap formed between itself and the tube 3.

The third cylinder 231 includes a main body part 241 and an enlarged diameter part 242.

The main body part 241 has a cylindrical shape with a constant inner diameter and a constant outer diameter, and is provided from one end portion to an intermediate portion of the third cylinder 231 in the axial direction. One end portion of the third cylinder 231 in the axial direction of the main body part 241 is fitted to the small diameter part 30 of the rod guide 25. The other end portion of the third cylinder 231 from the intermediate portion in the axial direction of the main body part 241 extends downward from the rod guide 25.

The enlarged diameter part 242 is provided at the other end portion, that is, a lower end portion, of the third cylinder 231 in the axial direction. An inner diameter of the enlarged diameter part 242 increases toward the lower end. An outer diameter of the enlarged diameter part 242 increases toward the lower end. The enlarged diameter part 242 increases in diameter in a direction away from the main body part 241 in the axial direction of the third cylinder 231. The third cylinder 231 opens downward.

The third cylinder 231 has a groove 246 provided to extend in the axial direction of the third cylinder 231 at an inner circumferential portion on one end side thereof in the axial direction. The groove 246 is provided at an inner circumferential portion on a lower end side of the third cylinder 231. The groove 246 is recessed outward in the radial direction of the third cylinder 231 from an inner circumferential surface of the third cylinder 231. The groove 246 extends from the enlarged diameter part 242 to a lower portion of the main body part 241. A plurality of grooves 246 are provided in the third cylinder 231 at regular intervals in the circumferential direction of the third cylinder 231. The plurality of grooves 246 have different lengths from the lower end of the third cylinder 231. In other words, the plurality of grooves 246 have different lengths in the axial direction of the third cylinder 231.

A buffer piston 250 is provided on the main shaft part 51 of the piston rod 21. The buffer piston 250 includes a first stopper member 251, a first locking ring 252, a second stopper member 253, a second locking ring 254, a ring member 255, and a buffer member 256.

The first stopper member 251, the first locking ring 252, the second stopper member 253, the second locking ring 254, the ring member 255, and the buffer member 256 are all annular, and allow the main shaft part 51 to pass through the inside thereof.

The first locking ring 252 is positioned in the axial direction of the main shaft part 51 and is attached to the main shaft part 51.

The first stopper member 251 is disposed on the rod guide 25 side of the first locking ring 252 in the axial direction of the piston rod 21. The first stopper member 251 is restricted in movement in a direction away from the rod guide 25 in the axial direction of the piston rod 21 by coming into contact with the first locking ring 252.

The second stopper member 253 includes a cylindrical part 261 and a flange part 262.

The cylindrical part 261 has a cylindrical shape.

The flange part 262 extends outward in the radial direction of the cylindrical part 261 from one end side of the cylindrical part 261 in the axial direction. The flange part 262 has an annular shape extending over the entire circumference of the cylindrical part 261. The flange part 262 has an outer diameter smaller than an inner diameter of the main body part 241 of the third cylinder 231. A radial groove 271 penetrating the flange part 262 in the radial direction of the flange part 262 is formed in the flange part 262 on the cylindrical part 261 side in the axial direction thereof. A plurality of radial grooves 271 are formed in the flange part 262 at intervals in the circumferential direction thereof.

The second locking ring 254 is positioned in the axial direction with respect to the main shaft part 51 and attached to the rod guide 25 side of the main shaft part 51 with respect to the first stopper member 251 in the axial direction.

The second stopper member 253 is disposed between the second locking ring 254 and the first stopper member 251 in the axial direction of the piston rod 21. The second stopper member 253 is provided on the main shaft part 51 so that the flange part 262 is further away from the first stopper member 251 with respect to the cylindrical part 261 in the axial direction of the piston rod 21. The second stopper member 253 restricts movement of the piston rod 21 to both sides in the axial direction by coming into contact with both the second locking ring 254 and the first stopper member 251.

The ring member 255 has an annular shape. The ring member 255 has an outer diameter equal to the inner diameter of the main body part 241 of the third cylinder 231. The ring member 255 has an inner diameter larger than an outer diameter of the cylindrical part 261 of the second stopper member 253, and smaller than an outer diameter of the flange part 262 of the second stopper member 253 and an outer diameter of the first stopper member 251. The ring member 255 has an axial length smaller than a length obtained by subtracting an axial length of the flange part 262 from an axial length of the cylindrical part 261 of the second stopper member 253. Thereby, the ring member 255 can move in the axial direction between the flange part 262 of the second stopper member 253 and the first stopper member 251. When the ring member 255 is separated from the first stopper member 251 in the axial direction, a passage 272, which is formed of a passage in the radial groove 271 of the second stopper member 253, a passage between the ring member 255 and the cylindrical part 261 of the second stopper member 253, and a passage between the movable ring 173 and the first stopper member 251, opens. The ring member 255 closes the passage 272 when it comes into contact with the first stopper member 251 in the axial direction.

The buffer member 256 is an elastic member. The buffer member 256 is disposed on the rod guide 25 side of the second stopper member 253 and the second locking ring 254 in the axial direction of the piston rod 21.

The buffer piston 250 enters the third cylinder 231 from below through an opening at the lower end of the third cylinder 231 and exits therefrom downward.

Here, when the piston rod 21 is in the first predetermined range in which the ring member 255 of the buffer piston 250 is disposed on a lower side of the third cylinder 231 and the ring member 255 is not fitted to the third cylinder 231, the inside of the third cylinder 231 is defined as the first chamber 19 as a whole.

From this state, in the extension stroke, the piston rod 21 moves to a third predetermined range on the rod guide 25 side from the first predetermined range. Then, the buffer piston 250 moving integrally with the piston rod 21 is fitted into the main body part 241 of the third cylinder 231 after the ring member 255 enters the inside of the enlarged diameter part 242 of the third cylinder 231. At the beginning of this fitting, the ring member 255 is pressed against the first stopper member 251 by a frictional force with the third cylinder 231 that comes in contact therewith. As a result, the ring member 255 closes the passage 272 by coming into contact with the first stopper member 251 in the axial direction. In the subsequent extension stroke, the ring member 255 slides inside the third cylinder 231 to approach the rod guide 25 in a state in which the passage 272 remains closed.

During the extension stroke in the third predetermined range, the buffer piston 250, together with the piston rod 21, moves to the rod guide 25 side while the ring member 255 closes the passage 272 as described above. At a lower portion of the third predetermined range, the ring member 255 is at a position of the plurality of grooves 246 provided in the third cylinder 231 to allow the oil fluid L to flow through the plurality of grooves 246. At that time, as the buffer piston 250 approaches the rod guide 25, among the plurality of grooves 246, the number of the grooves 246 in an open state decreases and finally becomes zero. Thereby, the third cylinder 231 and the buffer piston 250 increase generation of the damping force in stages.

At an upper limit position of the third predetermined range, the buffer piston 250 reduce an impact on the rod guide 25 by bringing the buffer member 256 into contact with the rod guide 25 and elastically deforming the buffer member 256.

During the compression stroke in the third predetermined range, the buffer piston 250, together with the piston rod 21, moves in a direction away from the rod guide 25 from a state in which the ring member 255 of the buffer piston 250 is fitted in the third cylinder 231. Then, the ring member 255 of the buffer piston 250 is separated from the first stopper member 251 in the axial direction by a frictional force with the third cylinder 231, thereby opening the passage 272. In the subsequent extension stroke, the buffer piston 250 moves in a direction away from the rod guide 25 while the ring member 255 keeps the passage 272 open. When the buffer piston 250 moves in a direction away from rod guide 25, the oil fluid L is allowed to flow through the passage 272. Thereby, the damping force on the movement of the piston rod 21 in the compression direction is reduced.

When the ring member 255 of the buffer piston 250 is separated from the rod guide 25 by a predetermined distance in the compression stroke from a state in which the ring member 255 is positioned on the rod guide 25 side with respect to all the grooves 246 in the third cylinder 231, the grooves 246 provided in the third cylinder 231 open. Then, in addition to the flow through the passage 272, the oil fluid L flows through the grooves 246 to reduce the damping force on the movement of the piston rod 21 in the compression direction. At this time, as the buffer piston 250 becomes further away from the rod guide 25, among the plurality of grooves 246, the number of the grooves 246 that allow the oil fluid L to flow increases. As a result, the damping force on the movement of the piston rod 21 in the compression direction is reduced in stages.

Next, main operations of the shock absorber 1 will be described.

"Compression Stroke in which Piston Rod 21 is in First Predetermined Range in Middle of Tube 3 in Axial Direction"

{First Speed Region in which Piston Speed is Lower than First Predetermined Value}

In this first speed region of the compression stroke, the oil fluid L from the second chamber 20 flows to the first chamber 19 from the second passage 72 through a fixed orifice (not illustrated) between the second damping valve 76 and the piston 18 in the piston assembly 17. Therefore, in the first speed region of the compression stroke, a damping force having orifice characteristics (in which the damping force is substantially proportional to the square of the piston speed) is generated.

{Second Speed Region in which Piston Speed is Equal to or Higher than First Predetermined Value}

In this second speed region of the compression stroke, the oil fluid L from the second chamber 20 opens the second damping valve 76 from the second passage 72 in the piston assembly 17 and flows into the first chamber 19. Therefore, in the second speed region of the compression stroke, a damping force having valve characteristics (in which the damping force is substantially proportional to the piston speed) due to the second damping valve 76 is generated.

"Extension Stroke in which the Piston Rod 21 is in the First Predetermined Range"

{Third Speed Region in which Piston Speed is Lower than Second Predetermined Value}

In this third speed region of the extension stroke, the oil fluid L from the first chamber 19 flows into the second chamber 20 from the first passage 71 through a fixed orifice (not illustrated) between the first damping valve 75 and the piston 18 in the piston assembly 17. Therefore, in the third speed region of the extension stroke, a damping force having orifice characteristics is generated.

{Fourth Speed Region in which Piston Speed is Equal to or Higher than Second Predetermined Value}

In this fourth speed region of the extension stroke, the oil fluid L from the first chamber 19 opens the first damping valve 75 from the first passage 71 in the piston assembly 17 and flows into the second chamber 20. Therefore, in the fourth speed region of the extension stroke, a damping force having valve characteristics due to the first damping valve 75 is generated.

"Compression Stroke in which Piston Rod 21 is in Second Predetermined Range on Lower Side of First Predetermined Range in Axial Direction of Tube 3"

In this compression stroke, the piston assembly 17 operates in the same manner as in the first predetermined range. In addition, the cup 100 of the damping force increasing mechanism 221 moves in a direction toward the base adapter 141 in the axial direction of the tube 3 to cause the movable ring 173 of the partition piston 143 to be fitted into the first cylinder 101. Then, at the beginning thereof, the movable ring 173 is pressed against the flange part 182 to close the passage 210.

In this state, the cup 100 moves in a direction toward the base adapter 141. Then, the oil fluid L in the first cylinder inner chamber 214 is squeezed by the plurality of grooves 116 provided in the first cylinder 101 and flows into the cylinder outer chamber 215. Thereby, generation of the damping force by the damping force increasing mechanism 221 increases. At that time, as the cup 100 approaches the base adapter 141, among the plurality of grooves 116, the number of the grooves 116 that allow the oil fluid L to flow from the first cylinder inner chamber 214 to the cylinder outer chamber 215 decreases and finally becomes zero. Thereby, the damping force generated by the damping force increasing mechanism 221 increases in stages, and the damping force on the movement of the piston rod 21 in the compression direction increases in stages. An amount of the damping force generated by the damping force increasing mechanism 221 in this way increases in addition to the damping force generated by the piston assembly 17. Here, at a position in which the number of the grooves 116 allowing the oil fluid L to flow from the first cylinder inner chamber 214 to the cylinder outer chamber 215 is zero, the movable ring 173 is fitted to the main body part 111 of the first cylinder 101 and closes the passage 210 to the maximum. Therefore, in the compression stroke after the number of the grooves 116 that allow the oil fluid L to flow from the first cylinder inner chamber 214 to the cylinder outer chamber 215 is made zero by the movable ring 173, the oil fluid L flowing from the first cylinder inner chamber 214 to the cylinder outer chamber 215 through a space between the first cylinder 101 and the partition piston 143 is squeezed to the maximum. Therefore, the damping force is further increased.

Here, when the cup 100 moves in a direction toward the base adapter 141, the relief valve 82 of the relief valve assembly 62 opens depending on a piston speed. Then, the oil fluid L flows from the first cylinder inner chamber 214 to the cylinder outer chamber 215 through the passages in the plurality of passage holes 85. Thereby, an excessive increase in pressure in the first cylinder inner chamber 214 is suppressed.

"Extension Stroke in which Piston Rod 21 is in Second Predetermined Range"

In this extension stroke, the piston assembly 17 operates in the same manner as in the first predetermined range. In addition, the cup 100 of the damping force increasing mechanism 221 moves in a direction away from the base adapter 141 in the axial direction of the tube 3. Then, at the beginning thereof, the movable ring 173 opens the passage 210 as illustrated in FIG. 4.

With the passage 210 opened in this way, the cup 100 moves in a direction away from the base adapter 141. Then, the oil fluid L in the cylinder outer chamber 215 flows into the first cylinder inner chamber 214 from the portion between the first cylinder 101 and the second cylinder 142 through the passage 210. When the movable ring 173 passes through the position of the grooves 116 provided in the first cylinder 101 from a state in which it is on a side opposite to the base adapter 141 with respect to all the grooves 116 provided in the first cylinder 101, the oil fluid L flows from the cylinder outer chamber 215 to the first cylinder inner chamber 214 through the passages in the grooves 116 in addition to the flow through the passage 210. At that time, as the cup 100 becomes further away from the base adapter 141, among the plurality of grooves 116, the number of the grooves 116 that allow the oil fluid L to flow from the cylinder outer chamber 215 to the first cylinder inner chamber 214 increases. Thereby, the damping force on the movement of the piston rod 21 in the extension direction is reduced in stages.

"Extension Stroke in which Piston Rod 21 is in Third Predetermined Range on Upper Side of First Predetermined Range in Axial Direction of Tube 3"

In this extension stroke, the piston assembly 17 operates in the same manner as in the first predetermined range. In addition, the buffer piston 250 illustrated in FIG. 1 moves in a direction toward the rod guide 25 in the axial direction of the tube 3 to fit the ring member 255 into the third cylinder 231. Then, at the beginning thereof, the ring member 255 closes the passage 272.

With the passage 272 closed in this way, the buffer piston 250 moves to the rod guide 25 side. Then, the oil fluid L in the third cylinder 231 is squeezed by the plurality of grooves 246 provided in the third cylinder 231 and flows out of the third cylinder 231. Therefore, generation of the damping force by the third cylinder 231 and the buffer piston 250 increases. At that time, as the buffer piston 250 approaches the rod guide 25, among the plurality of grooves 246, the number of the grooves 246 that allow the oil fluid L to flow decreases and finally becomes zero. Thereby, the generated damping force increases in stages, and the damping force on the movement of the piston rod 21 in the extension direction increases in stages. An amount of the damping force generated by the buffer piston 250 and the third cylinder 231 increases with respect to the damping force generated by the piston assembly 17.

"Compression Stroke in which Piston Rod 21 is in Third Predetermined Range"

In this compression stroke, the piston assembly 17 operates in the same manner as in the first predetermined range.

In addition, the buffer piston 250 moves in a direction away from the rod guide 25. Then, at the beginning thereof, the ring member 255 opens the passage 272.

With the passage 272 opened in this way, the buffer piston 250 moves in a direction away from the rod guide 25. Then, the oil fluid L flows into the third cylinder 231 from outside the third cylinder 231 through the passage 272. When the ring member 255 of the buffer piston 250 passes through the position of the grooves 246 provided in the third cylinder 231 from a state of being on the rod guide 25 side with respect to all the grooves 246 provided in the third cylinder 231, the oil fluid L flows from outside the third cylinder 231 into the third cylinder 231 through the grooves 246 in addition to the flow through the passage 272. At that time, as the buffer piston 250 becomes further away from the rod guide 25, among the plurality of grooves 246, the number of the grooves 246 that allow the oil fluid L to flow increases. Thereby, the damping force on the movement of the piston rod 21 in the compression direction is reduced in stages.

The U.S. Pat. No. 10,107,352 described above discloses a shock absorber that increases a damping force when a piston rod reaches a predetermined range on a limit side during a compression stroke in which the piston rod is pushed into a tube. This shock absorber includes a cup-shaped insert provided in a base valve assembly, a secondary rod attached to a main piston rod, and a secondary piston assembly attached to the secondary rod. Then, when the secondary piston assembly enters the insert, a partition chamber is formed in the insert and an oil fluid discharged from the partition chamber is suppressed, thereby increasing the damping force. This shock absorber has a complicated structure in which the secondary rod is attached to the main piston rod and the secondary piston assembly is attached to the secondary rod. Therefore, this shock absorber results in an increase in cost. For example, if a stroke position for increasing the damping force of the main piston rod is to be changed, it is necessary to change the secondary rod, and this also causes an increase in cost.

The shock absorber 1 of the first embodiment includes the tube 3 having the inner chamber 6 inside, the piston rod 21 having the first end portion 22 in the axial direction disposed in the tube 3 and the second end portion 23 in the axial direction disposed outside the tube 3, the piston assembly 17 connected to an intermediate position of the piston rod 21 in the axial direction to divide the inner chamber 6 into the first chamber 19 on the second end portion 23 side of the piston rod 21 and the second chamber 20 on the first end portion 22 side thereof, and configured to generate a damping force when the piston rod 21 moves, and the damping force increasing mechanism 221 increasing the damping force when the piston assembly 17 moves to the second chamber 20 side. Then, the damping force increasing mechanism 221 of the shock absorber 1 includes the first cylinder 101 connected to the first end portion 22 side of the piston rod 21 with respect to the piston assembly 17, and the partition piston 143 that enters the inside of the first cylinder 101 to form the first cylinder inner chamber 214 in the first cylinder 101 when the piston assembly 17 moves to the second chamber 20 side.

As described above, in the shock absorber 1, the first cylinder 101, which allows the partition piston 143 to enter and form the first cylinder inner chamber 214 therein when the piston assembly 17 moves to the second chamber 20 side, is connected to the first end portion 22 side of the piston rod 21 with respect to the piston assembly 17. Therefore, the shock absorber 1 can be simplified in structure and increase in cost can be curbed. For example, if a stroke position for increasing the damping force of the piston rod 21 is to be changed, it need only change a position of the partition piston 143, and therefore increase in cost can be curbed.

In the shock absorber 1, the second cylinder 142 supporting the partition piston 143 is provided in the body valve assembly 31 provided on a side of the second chamber 20 opposite to the piston assembly 17. Therefore, the partition piston 143 can be supported with a simple structure.

In the shock absorber 1, since the partition piston 143 is supported by the second cylinder 142 having a smaller diameter than the first cylinder 101, the partition piston 143 can be stably supported. Further, it is also possible to support the partition piston 143 with the shaft portion 126 of the bolt 124 of the body valve assembly 31 by extending the shaft portion 126 to the piston assembly 17 side.

In the shock absorber 1, the communication passage 208 through which air in the second cylinder 142 is allowed to flow is provided between the partition piston 143 and the second cylinder 142. Therefore, the shock absorber 1 can smoothly discharge the air in the second cylinder 142 to the outside of the second cylinder 142 when the oil fluid L is filled into the tube 3.

In the shock absorber 1, the first cylinder 101 of the damping force increasing mechanism 221 is connected to the relief valve assembly 62 connected to the first end portion 22 side of the piston rod 21 with respect to the piston assembly 17. Therefore, the shock absorber 1 can be simplified in structure, and increase in cost can be curbed.

The relief valve assembly 62 of the shock absorber 1 includes the support piston 81 connected to the first end portion 22 side of the piston rod 21 with respect to the piston assembly 17 to support the first cylinder 101, and the plate-shaped relief valve 82 provided on the support piston 81. Therefore, even if the relief valve 82 is provided in the damping force increasing mechanism 221, the shock absorber 1 can be simplified in structure, and increase in cost can be curbed.

In the shock absorber 1, the partition piston 143 includes the passage 210 that allows communication between the cylinder outer chamber 215 and the first cylinder inner chamber 214 in the second chamber 20, and the movable ring 173 that opens the passage 210 when the piston assembly 17 moves to the first chamber 19 side and closes the passage 210 when the piston assembly 17 moves to the second chamber 20 side. Therefore, the shock absorber 1 can smoothly reduce the damping force of the damping force increasing mechanism 221 during the extension stroke even if the damping force is increased by the damping force increasing mechanism 221 during the compression stroke.

Second Embodiment

Figure 5:
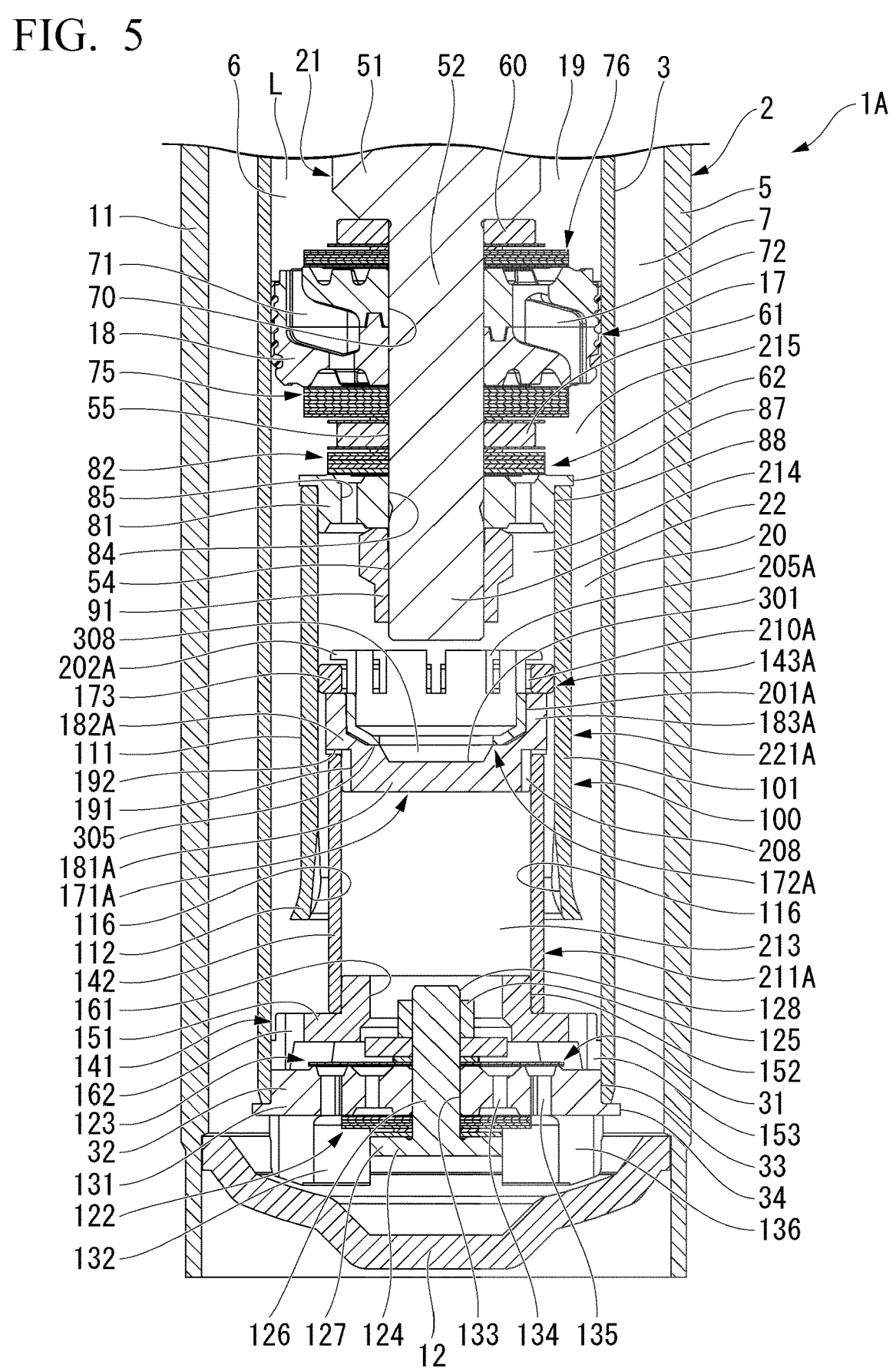
FIG. 5 is a cross-sectional view of a main part illustrating a shock absorber of a second embodiment according to the present invention.

Next, a shock absorber of a second embodiment will be described mainly on the basis of FIGS. 5 and 6, focusing on differences from the first embodiment. Further, parts common to those in the first embodiment are denoted by the same terms and the same reference signs.

A shock absorber 1A includes a damping force increasing mechanism 221A, which is partially different from the damping force increasing mechanism 221, instead of the damping force increasing mechanism 221. The damping force increasing mechanism 221A includes a partition piston 143A, which is partially different from the partition piston 143, instead of the partition piston 143. The partition piston 143A is attached to an end portion of a second cylinder 142 on a side opposite to a base adapter 141 in an axial direction, that is, to an upper end portion of the second cylinder 142, similarly to the partition piston 143 of the first embodiment.

The partition piston 143A includes a base member 171A, which is partially different from the base member 171, instead of the base member 171. The base member 171A includes a main body part 181A, a connection part 182A, and a cylindrical part 183A.

The main body part 181A has a columnar shape. On one side in the axial direction of the main body part 181A, a recessed part 301 is formed to be recessed toward the other side in the axial direction. The recessed part 301 is provided at a center position in a radial direction of the main body part 181A.

The connection part 182A extends outward in the radial direction of the main body part 181A from one end side of the main body part 181A in the axial direction. The connection part 182A has an annular shape extending over the entire circumference of the main body part 181A. The connection part 182A has an outer diameter smaller than an inner diameter of a main body part 111 of a first cylinder 101.

In the main body part 181A, an axial groove 191 similar to that of the first embodiment is formed to extend in the axial direction of the main body part 181A at an outer circumferential portion of a portion excluding the connection part 182A. A radial groove 192 similar to that of the first embodiment is formed in the connection part 182A on the axial groove 191 side in the axial direction to penetrate the connection part 182A in the radial direction of the connection part 182A.

The cylindrical part 183A extends from an outer circumferential side of the connection part 182A to a side opposite to the main body part 181A in the axial direction of the connection part 182A.

In the axial direction of the base member 171A, the recessed part 301 of the main body part 181A is formed from an end surface of the main body part 181A on the cylindrical part 183A side to a side opposite to the cylindrical part 183A from the connection part 182A.

The partition piston 143A includes a locking member 172A, which is partially different from the locking member 172, instead of the locking member 172.

The locking member 172A includes a contact part 305, a fitting part 201A, and a flange part 202A.

The fitting part 201A has a cylindrical shape.

The flange part 202A extends outward in the radial direction of the fitting part 201A from one end side in the axial direction of the fitting part 201A. The flange part 202A has a disc shape. The flange part 202A has an outer diameter smaller than an inner diameter of the main body part 111 of the first cylinder 101.

The contact part 305 extends inward in the radial direction of the fitting part 201A from an end portion in the axial direction of the fitting part 201A opposite to the flange part 202A. The contact part 305 has an annular shape. The contact part 305 has an inner diameter equal to an inner diameter of the recessed part 301 on an opening side.

Figure 6:
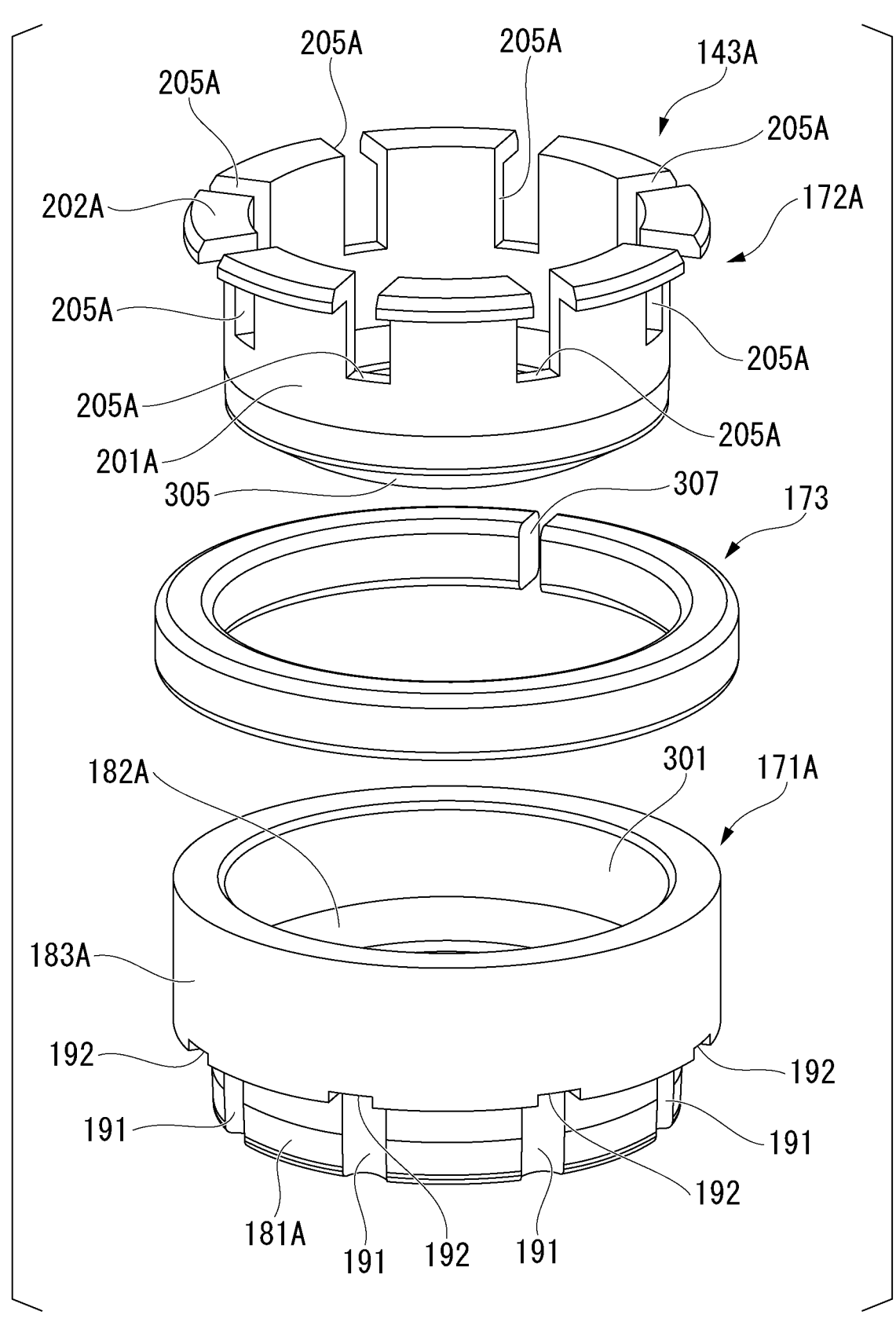
FIG. 6 is an exploded perspective view illustrating a partition piston of the shock absorber of the second embodiment according to the present invention.

As illustrated in FIG. 6, the locking member 172A includes a passage groove 205A formed to be continuous with the flange part 202A and a portion of the fitting part 201A on the flange part 202A side in the axial direction. The passage groove 205A penetrates the flange part 202A in the axial direction of the flange part 202A and in the radial direction of the flange part 202A. The passage groove 205A penetrates the fitting part 201A in the radial direction of the fitting part 201A. A plurality of passage grooves 205A are formed in the locking member 172A at intervals in the circumferential direction thereof.

A movable ring 173 has a portion that is broken in the circumferential direction to form a circumferential gap 307, and this allows the movable ring 173 to expand and contract in the circumferential direction and radial direction. An inner diameter of the movable ring 173 in a natural state is smaller than an outer diameter of the cylindrical part 183A of the base member 171A and an outer diameter of the flange part 202A of the locking member 172A. When the movable ring 173 is contracted in diameter, an outer diameter thereof is equal to the inner diameter of the main body part 111 of the first cylinder 101 as illustrated in FIG. 5. The inner diameter of the movable ring 173 in this state is larger than an outer diameter of the fitting part 201A of the locking member 172A. Also, even in this state, the circumferential gap 307 of the movable ring 173 does not reduce to zero in size.

The base member 171A of the partition piston 143A is fitted into an inner circumferential portion of an upper end portion of the second cylinder 142 at the main body part 181A to be fixed to the second cylinder 142. At that time, the connection part 182A of the base member 171A comes in contact with the second cylinder 142 in the axial direction of the base member 171A. In the base member 171A fixed to the second cylinder 142 in this way, the axial groove 191 and the radial groove 192 form a communication passage 208 that allows a radially inner side of the second cylinder 142 to communicate with a radially outer side thereof as in the first embodiment.

In the partition piston 143A, the movable ring 173 is mounted on an upper side of the cylindrical part 183A of the base member 171A that is in a state of being fixed to the second cylinder 142 in this way.

From this state, the partition piston 143A is fixed to the base member 171A when the fitting part 201A of the locking member 172A is inserted through radially inside of the movable ring 173 and then press-fitted into an inner circumferential portion of the cylindrical part 183A of the base member 171A. At that time, the contact part 305 of the locking member 172A comes into contact with an end surface of the main body part 181A of the base member 171A on the cylindrical part 183A side in the axial direction. Then, the flange part 202A of the locking member 172A covers the movable ring 173 from a side of the movable ring 173 opposite to the cylindrical part 183A in the axial direction. Thereby, the movable ring 173 is sandwiched between the cylindrical part 183A of the base member 171A and the flange part 202A of the locking member 172A in the axial direction.

In the axial direction of the partition piston 143A, a length of the movable ring 173 is smaller than a distance between the cylindrical part 183A and the flange part 202A. Therefore, the movable ring 173 is movable in the axial direction between the cylindrical part 183A and the flange part 202A.

When the movable ring 173 is separated from the cylindrical part 183A in the axial direction, the movable ring 173 opens a passage 210A formed of passages in the plurality of passage grooves 205A of the locking member 172A and a passage between the movable ring 173 and the cylindrical part 183A of the base member 171A. The movable ring 173 closes the passage 210A when it comes into contact with the cylindrical part 183A in the axial direction.

Since the locking member 172A is cylindrical, the partition piston 143A has a recess-shaped part 308 formed at a center in the radial direction to be recessed to the second cylinder 142 side in the axial direction of the partition piston 143A from an end surface of the partition piston 143A on a side opposite to the second cylinder 142 in the axial direction. The recess-shaped part 308 includes the recessed part 301.

The partition piston 143A is supported by a bottom member 12 of a tube 3 via the second cylinder 142, the base adapter 141, and a seat member 32 of a body valve assembly 31. In other words, the second cylinder 142 having a smaller diameter than the first cylinder 101 is provided above the body valve assembly 31 via the base adapter 141 to support the partition piston 143A. The partition piston 143A and a partition piston support body 211 are provided in a second chamber 20.

In the shock absorber 1A, the inside of the second cylinder 142 is defined as a second cylinder inner chamber 213. The second cylinder inner chamber 213 is surrounded by the body valve assembly 31, the base adapter 141, the second cylinder 142, and the partition piston 143A.

The partition piston 143A enters the first cylinder 101 from below through an opening at a lower end of the first cylinder 101 and exits therefrom downward.

Here, when a piston rod 21 is in a first predetermined range in which a cup 100 including the first cylinder 101 is disposed on an upper side of the partition piston 143A and the cup 100 is not yet fitted to the partition piston 143A, the inside of the cup 100 serves as the second chamber 20 as a whole.

From this state, in a compression stroke, the piston rod 21 moves to a second predetermined range on the base adapter 141 side with respect to the first predetermined range. Then, the cup 100, which moves integrally with the piston rod 21, covers the partition piston 143A to cause the movable ring 173 of the partition piston 143A to enter the inside of the enlarged diameter part 112 of the first cylinder 101, and then cause the movable ring 173 to be fitted into the main body part 111 of the first cylinder 101. At the beginning of the fitting, the movable ring 173 is pressed against the cylindrical part 183A of the base member 171A by a frictional force with the first cylinder 101 that comes in contact therewith, thereby closing the passage 210A. In the subsequent compression stroke, the movable ring 173 slides inside the first cylinder 101 to approach a support piston 81 while maintaining the state of being pressed against the cylindrical part 183A and closing the passage 210A as described above.

When the first cylinder 101 is fitted to the movable ring 173 of the partition piston 143A, the second chamber 20 is divided into a first cylinder inner chamber 214 inside the first cylinder 101 and a cylinder outer chamber 215 outside the first cylinder 101. The first cylinder inner chamber 214 is a portion inside the first cylinder 101 between a relief valve assembly 62 and the partition piston 143A. The cylinder outer chamber 215 is a portion of the second chamber 20 excluding the first cylinder inner chamber 214. The passage 210A of the partition piston 143A is a passage that allows communication between the cylinder outer chamber 215 and the first cylinder inner chamber 214, and the movable ring 173 can open and close the passage 210A.

During the compression stroke in the second predetermined range, the cup 100 moves to the base adapter 141 side together with the piston rod 21 while the movable ring 173 is brought into contact with the cylindrical part 183A and closes the passage 210A as described above. At an upper portion of the second predetermined range, as in the upper portion of the second predetermined range in the first embodiment, the movable ring 173 is at a position of a plurality of grooves 116 provided in the first cylinder 101 to allow the oil fluid L to flow from the first cylinder inner chamber 214 to the cylinder outer chamber 215 through passages in the plurality of grooves 116. At that time, as the cup 100 approaches the base adapter 141, among the plurality of grooves 116, the number of the grooves 116 that allow the oil fluid L to flow from the first cylinder inner chamber 214 to the cylinder outer chamber 215 decreases and finally becomes zero. Thereby, the cup 100 including the first cylinder 101 and the partition piston 143B increase generation of the damping force in stages. At a position in which the number of the grooves 116 that allow the oil fluid L to flow from the first cylinder inner chamber 214 to the cylinder outer chamber 215 is zero, the movable ring 173 is fitted to the main body part 111 of the first cylinder 101 and closes the passage 210A to the maximum. In the subsequent compression stroke, the movable ring 173 slides in the first cylinder 101 to approach the support piston 81 in a state in which the passage 210A remains closed to the maximum as described above. In other words, the movable ring 173 closes the passage 210A when the piston assembly 17 moves to the second chamber 20 side.

The relief valve assembly 62, the first cylinder 101 connected to the relief valve assembly 62, and the partition piston 143A constitute the damping force increasing mechanism 221A that increases the damping force in addition to the damping force generated by the piston assembly 17 when the piston assembly 17 moves to the second chamber 20 side. The damping force increasing mechanism 221A includes the partition piston 143A that enters the inside of the first cylinder 101 to form the first cylinder inner chamber 214 in the first cylinder 101 when the piston assembly 17 moves to the second chamber 20 side.

Also, during the compression stroke in the second predetermined range, the cup 100 moves to the base adapter 141 side while the partition piston 143A closes the passage 210A as described above. At that time, a relief valve 82 opens as in the first embodiment depending on a piston speed which is a moving speed of the piston rod 21, the piston 18, and the support piston 81 with respect to the tube 3.

During the extension stroke in the second predetermined range, the cup 100, together with the piston rod 21, moves in a direction away from the base adapter 141. Then, the movable ring 173 of the partition piston 143A is separated from the cylindrical part 183A in the axial direction by the frictional force with the first cylinder 101, thereby opening the passage 210A. In the subsequent extension stroke, the cup 100 moves in a direction away from the base adapter 141 while the passage 210A remains open due to the movable ring 173. When the cup 100 moves in a direction away from the base adapter 141, the oil fluid L is allowed to flow from a portion of the cylinder outer chamber 215 between the first cylinder 101 and the second cylinder 142 to the first cylinder inner chamber 214 through the passage 210A. Thereby, the damping force on the movement of the piston rod 21 in the extension direction is reduced.

In the extension stroke from a state in which the movable ring 173 is on the support piston 81 side with respect to all the grooves 116 in the first cylinder 101, when the cup 100 separates the support piston 81 from the movable ring 173 by a predetermined distance, the movable ring 173 is positioned at a position of the grooves 116 provided in the first cylinder 101 to open the grooves 116 to the first cylinder inner chamber 214. Then, in addition to the flow through the passage 210A, the oil fluid L flows from the cylinder outer chamber 215 to the first cylinder inner chamber 214 through the passages in the grooves 116 to reduce the damping force on the movement of the piston rod 21 in the extension direction. At that time, the plurality of grooves 116 reduce the damping force on the movement of the piston rod 21 in the extension direction in stages.

Next, main operations of the shock absorber 1A different from those of the shock absorber 1 will be described.

"Compression Stroke in which Piston Rod 21 is in Second Predetermined Range"

In this compression stroke, the piston assembly 17 operates in the same manner as in the first predetermined range. In addition, the cup 100 of the damping force increasing mechanism 221A moves in a direction toward the base adapter 141 in the axial direction of the tube 3 to cause the movable ring 173 of the partition piston 143A to be fitted into the first cylinder 101. Then, at the beginning thereof, the movable ring 173 is pressed against the cylindrical part 183A of the base member 171A to close the passage 210A.

In this state, the cup 100 moves in a direction toward base adapter 141. Then, the oil fluid L in the first cylinder inner chamber 214 is squeezed by the plurality of grooves 116 provided in the first cylinder 101 and flows into the cylinder outer chamber 215. Thereby, generation of the damping force by the damping force increasing mechanism 221A increases. At that time, as the cup 100 approaches the base adapter 141, among the plurality of grooves 116, the number of the grooves 116 that allow the oil fluid L to flow from the first cylinder inner chamber 214 to the cylinder outer chamber 215 decreases and finally becomes zero. Thereby, the damping force generated by the damping force increasing mechanism 221A increases in stages, and the damping force on the movement of the piston rod 21 in the compression direction increases in stages. An amount of the damping force generated by the damping force increasing mechanism 221A in this way increases in addition to the damping force generated by the piston assembly 17. Here, at a position in which the number of the grooves 116 allowing the oil fluid L to flow from the first cylinder inner chamber 214 to the cylinder outer chamber 215 is zero, the movable ring 173 is fitted to the main body part 111 of the first cylinder 101 and closes the passage 210A to the maximum. Therefore, in the compression stroke after the number of the grooves 116 that allow the oil fluid L to flow from the first cylinder inner chamber 214 to the cylinder outer chamber 215 is made zero by the movable ring 173, the oil fluid L flowing from the first cylinder inner chamber 214 to the cylinder outer chamber 215 through a space between the first cylinder 101 and the partition piston 143A is squeezed to the maximum. Therefore, the damping force is further increased.

Here, when the cup 100 moves in a direction toward the base adapter 141, the relief valve 82 of the relief valve assembly 62 opens depending on a piston speed. Then, the oil fluid L flows from the first cylinder inner chamber 214 to the cylinder outer chamber 215 through passages in a plurality of passage holes 85. Thereby, an excessive increase in pressure in the first cylinder inner chamber 214 is suppressed.

"Extension Stroke in which Piston Rod 21 is in Second Predetermined Range"

In this extension stroke, the piston assembly 17 operates in the same manner as in the first predetermined range. In addition, the cup 100 of the damping force increasing mechanism 221A moves in a direction away from the base adapter 141 in the axial direction of the tube 3. Then, at the beginning thereof, the movable ring 173 opens the passage 210A.

With the passage 210A opened in this way, the cup 100 moves in a direction away from the base adapter 141. Then, the oil fluid L in the cylinder outer chamber 215 flows into the first cylinder inner chamber 214 from the portion between the first cylinder 101 and the second cylinder 142 through the passage 210A. When the movable ring 173 passes through the position of the grooves 116 provided in the first cylinder 101 from a state in which it is on a side opposite to the base adapter 141 with respect to all the grooves 116 provided in the first cylinder 101, the oil fluid L flows from the cylinder outer chamber 215 to the first cylinder inner chamber 214 through the passages in the grooves 116 in addition to the flow through the passage 210A. At that time, as the cup 100 becomes further away from the base adapter 141, among the plurality of grooves 116, the number of the grooves 116 that allow the oil fluid L to flow from the cylinder outer chamber 215 to the first cylinder inner chamber 214 increases. Thereby, the damping force on the movement of the piston rod 21 in the extension direction is reduced in stages.

The shock absorber 1A of the second embodiment includes the damping force increasing mechanism 221A that increases the damping force when the piston assembly 17 moves to the second chamber 20 side. Then, the damping force increasing mechanism 221A of the shock absorber 1A includes the first cylinder 101 connected to the first end portion 22 side of the piston rod 21 with respect to the piston assembly 17, and the partition piston 143A that enters the inside of the first cylinder 101 to form the first cylinder inner chamber 214 in the first cylinder 101 when the piston assembly 17 moves to the second chamber 20 side.

As described above, in the shock absorber 1A, the first cylinder 101, which allows the partition piston 143A to enter and form the first cylinder inner chamber 214 therein when the piston assembly 17 moves to the second chamber 20 side, is connected to the first end portion 22 side of the piston rod 21 with respect to the piston assembly 17. Therefore, the shock absorber 1A can be simplified in structure, and increase in cost can be curbed. For example, if a stroke position for increasing the damping force of the piston rod 21 is to be changed, it need only change a position of the partition piston 143A, and therefore increase in cost can be curbed.

In the shock absorber 1A, the second cylinder 142 supporting the partition piston 143A is provided in the body valve assembly 31 provided on a side of the second chamber 20 opposite to the piston assembly 17. Therefore, the partition piston 143A can be supported with a simple structure.

In the shock absorber 1A, since the partition piston 143A is supported by the second cylinder 142 having a smaller diameter than the first cylinder 101, the partition piston 143A can be stably supported. Further, it is also possible to support the partition piston 143A with a shaft portion 126 of a bolt 124 of the body valve assembly 31 by extending the shaft portion 126 to the piston assembly 17 side.

In the shock absorber 1A, the communication passage 208 through which air in the second cylinder 142 is allowed to flow is provided between the partition piston 143A and the second cylinder 142. Therefore, the shock absorber 1A can smoothly discharge the air in the second cylinder 142 to the outside of the second cylinder 142 when the oil fluid L is filled into the tube 3.

In the shock absorber 1A, the partition piston 143A includes the passage 210A that allows communication between the cylinder outer chamber 215 and the first cylinder inner chamber 214 in the second chamber 20, and the movable ring 173 that opens the passage 210A when the piston assembly 17 moves to the first chamber 19 side and closes the passage 210A when the piston assembly 17 moves to the second chamber 20 side. Therefore, the shock absorber 1A can smoothly reduce the damping force of the damping force increasing mechanism 221A during the extension stroke even if the damping force is increased by the damping force increasing mechanism 221A during the compression stroke.

In the shock absorber 1A of the second embodiment, the partition piston 143A includes the recess-shaped part 308 that is recessed to the second cylinder 142 side in the axial direction at a center in the radial direction. Therefore, in the shock absorber 1A, a weight of the partition piston 143A can be reduced.

Third Embodiment

Next, a shock absorber of a third embodiment will be described mainly on the basis of FIGS. 7 and 8, focusing on differences from the first embodiment. Further, parts common to those in the first embodiment are denoted by the same terms and the same reference signs.

Figure 7:
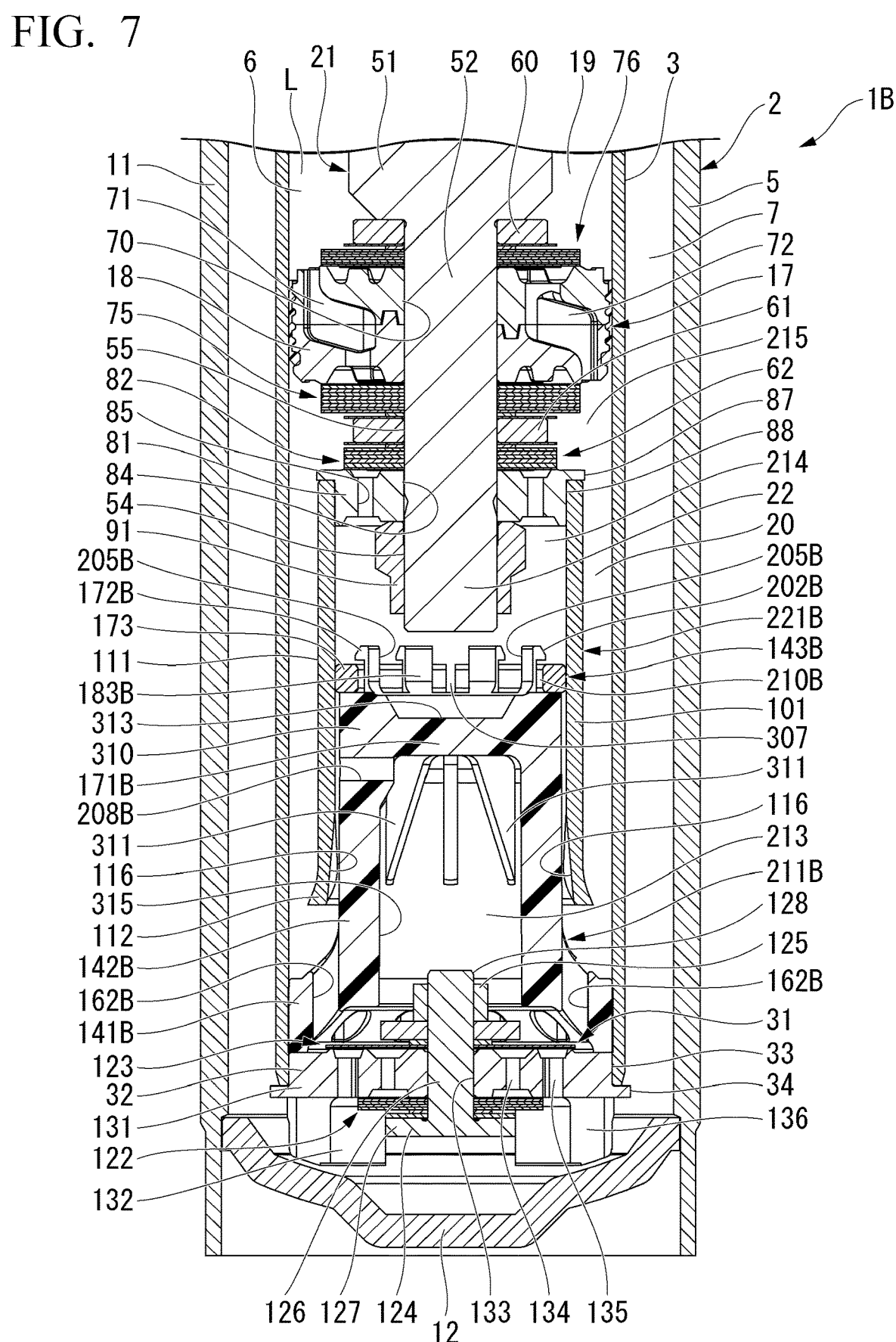
FIG. 7 is a cross-sectional view of a main part illustrating a shock absorber of a third embodiment according to the present invention.
Figure 8:
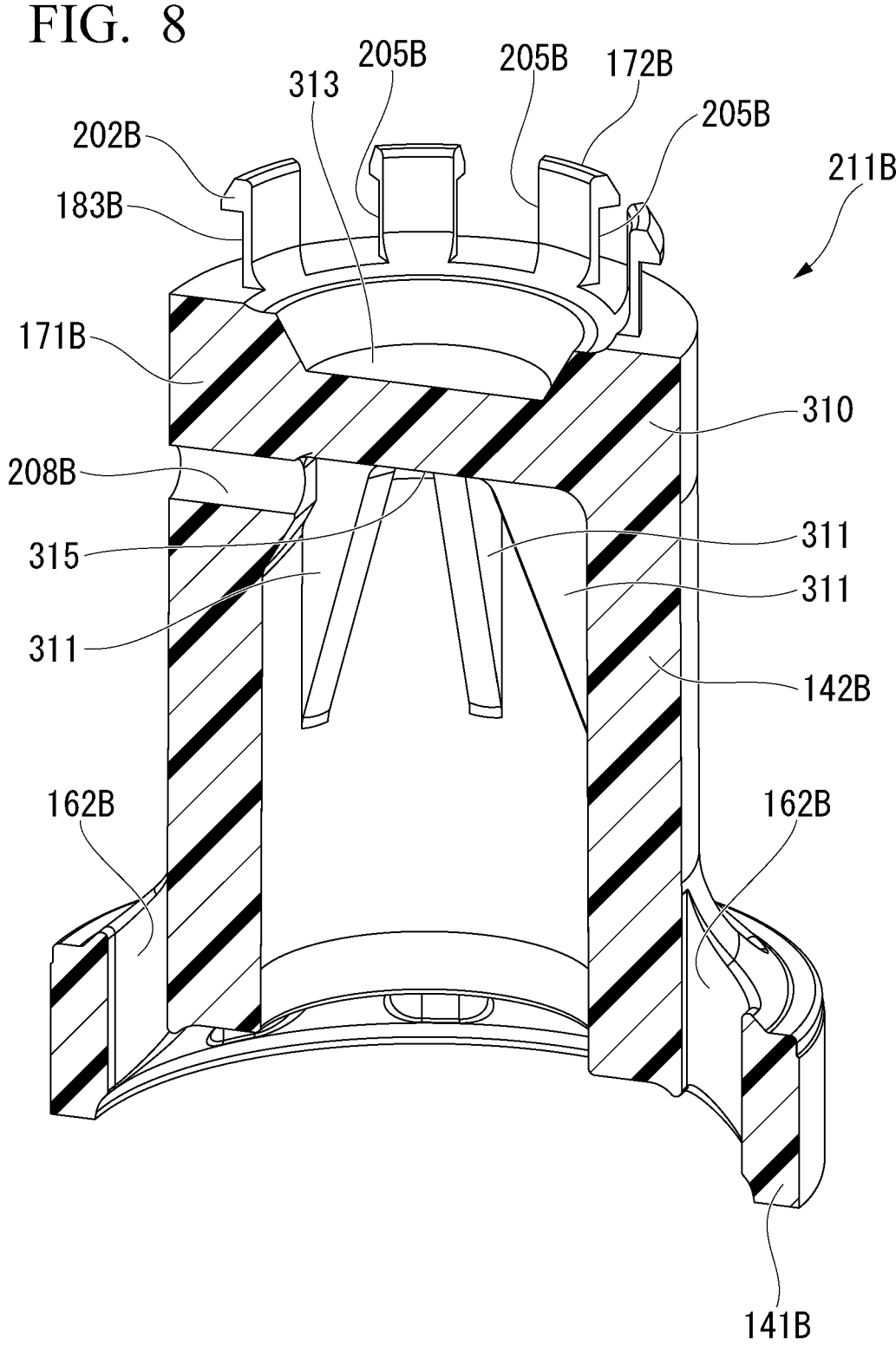
FIG. 8 is a perspective cross-sectional view illustrating a movable ring support body of the shock absorber of the third embodiment according to the present invention.

A shock absorber 1B of the third embodiment includes a partition piston support body 211 having the base adapter 141 and the second cylinder 142 of the first embodiment, and a movable ring support body 211B illustrated in FIGS. 7 and 8 in which the base member 171 and the locking member 172 are integrated instead of the base member 171 and the locking member 172. The movable ring support body 211B is integrally formed by, for example, injection forming of a synthetic resin material.

As illustrated in FIG. 8, the movable ring support body 211B includes a support base part 141B, a support cylindrical part 142B, a ring support part 310, and a reinforcing part 311.

The support base part 141B has an annular shape. A communication hole 162B penetrating the support base part 141B in an axial direction of the support base part 141B is formed in the support base part 141B. A plurality of communication holes 162B are provided in the support base part 141B at regular intervals in a circumferential direction of the support base part 141B.

The support cylindrical part 142B extends from an inner circumferential side of the support base part 141B to one side in the axial direction of the support base part 141B. The support cylindrical part 142B has a cylindrical shape. The plurality of communication holes 162B of the support base part 141B are disposed on an outer side of the support cylindrical part 142B in a radial direction with respect to the support cylindrical part 142B. The support cylindrical part 142B has an outer diameter smaller than an inner diameter of a main body part 111 of a first cylinder 101 as illustrated in FIG. 7. A communication passage 208B is formed at an end portion of the support cylindrical part 142B on a side opposite to the support base part 141B in the axial direction. The communication passage 208B penetrates the support cylindrical part 142B in the radial direction of the support cylindrical part 142B.

The ring support part 310 is provided at an end portion of the support cylindrical part 142B on a side opposite to the support base part 141B in the axial direction. The ring support part 310 includes a base part 171B and a locking part 172B.

The base part 171B is provided at an end portion of the support cylindrical part 142B on a side opposite to the support base part 141B in the axial direction. The base part 171B has a disc shape. The base part 171B has an outer diameter equal to that of the support cylindrical part 142B. The base part 171B closes the end portion of the support cylindrical part 142B on a side opposite to the support base part 141B in the axial direction. A recessed part 313 is formed at a center of the base part 171B in the radial direction to be recessed to the support cylindrical part 142B side from an end surface of the base part 171B on a side opposite to the support cylindrical part 142B in the axial direction.

The movable ring support body 211B includes a recess-shaped part 315 formed to be recessed from an end surface of the support base part 141B on a side opposite to the support cylindrical part 142B in the axial direction to the base part 171B by the support base part 141B, the support cylindrical part 142B, and the base part 171B. The communication passage 208B formed in the support cylindrical part 142B opens in the vicinity of a bottom portion of the recess-shaped part 315.

In the movable ring support body 211B, the reinforcing part 311 is formed in the recess-shaped part 315. The reinforcing part 311 has a triangular plate shape. The reinforcing part 311 connects a portion of the support cylindrical part 142B on the base part 171B side in the axial direction and a portion of the base part 171B on the support cylindrical part 142B side in the axial direction. A plurality of reinforcing parts 311 are formed in the movable ring support body 211B at intervals in the circumferential direction thereof. The communication passage 208B is disposed to have a phase difference from the reinforcing parts 311 in the circumferential direction of the movable ring support body 211B.

The locking part 172B is provided on a side opposite to the support cylindrical part 142B in the axial direction of the base part 171B. The locking part 172B includes a cylindrical part 183B and a flange part 202B.

The cylindrical part 183B extends in a direction opposite to the support cylindrical part 142B from an end surface of the base part 171B on a side opposite to the support cylindrical part 142B in the axial direction. The cylindrical part 183B has a cylindrical shape that is coaxial with the base part 171B. The cylindrical part 183B has an outer diameter smaller than an outer diameter of the base part 171B.

The flange part 202B extends outward in the radial direction of the cylindrical part 183B from an end portion of the cylindrical part 183B on a side opposite to the base part 171B in the axial direction. The flange part 202B has an outer diameter smaller than the inner diameter of the main body part 111 of the first cylinder 101.

A passage groove 205B is formed in the locking part 172B to be continuous with the flange part 202B and the cylindrical part 183B. The passage groove 205B penetrates the flange part 202B in the axial direction of the flange part 202B and in the radial direction of the flange part 202B. The passage groove 205B penetrates a fitting part 201B in the radial direction of the fitting part 201B. A plurality of passage grooves 205B are formed in the locking part 172B at intervals in the circumferential direction thereof. Thereby, the locking part 172B is elastically deformable such that a side thereof opposite to the base part 171B decreases in diameter as a whole with the base part 171B side in the axial direction as a base end.

The movable ring support body 211B is fixed by press-fitting the support base part 141B into an inner circumferential portion of a tube 3. At that time, a lower end portion of the support base part 141B comes into contact with an upper surface of an outer circumferential portion of a base part 131 of a seat member 32. Also, at that time, the movable ring support body 211B hitting a bolt 124 and a nut 125 of a body valve assembly 31 is avoided by the recess-shaped part 315. Also, at that time, the support base part 141B of the movable ring support body 211B surrounds a disc valve 123 of the body valve assembly 31 from an outer side in the radial direction. In other words, the support base part 141B is disposed to be spaced apart on a radially outer side of the disc valve 123 with respect to the disc valve 123. The movable ring support body 211B is supported by the body valve assembly 31 in the axial direction thereof and supported by the tube 3 in the radial direction thereof.

In the movable ring support body 211B, the support cylindrical part 142B extends from the support base part 141B to a side opposite to the body valve assembly 31 in the axial direction of the support base part 141B. In the movable ring support body 211B, the ring support part 310 is provided at an end portion of the support cylindrical part 142B on a side opposite to the body valve assembly 31 in the axial direction. The movable ring support body 211B is provided in a second chamber 20.

As described above, the support base part 141B mounted on the body valve assembly 31 is provided at one end of the movable ring support body 211B in the axial direction. An inner circumferential portion of the support base part 141B increases in diameter toward the body valve assembly 31 in the axial direction of the support base part 141B.

An inner diameter of a movable ring 173 in a natural state is smaller than an outer diameter of the base part 171B and an outer diameter of the flange part 202B of the locking part 172B. When the movable ring 173 is contracted in diameter, an outer diameter thereof is equal to the inner diameter of the main body part 111 of the first cylinder 101. The inner diameter of the movable ring 173 in this state is larger than an outer diameter of the cylindrical part 183B of the locking part 172B. Also, even in this state, a circumferential gap 307 of the movable ring 173 does not reduce to zero in size.

The movable ring 173 is assembled to the locking part 172B from a side opposite to the base part 171B in the axial direction of the locking part 172B. At that time, the movable ring 173 is assembled to the locking part 172B while elastically deforming the locking part 172B so that a side of the locking part 172B opposite to the base part 171B in the axial direction decreases in diameter. When the movable ring 173 is assembled, the locking part 172B returns from the elastic deformation. In this state, the flange part 202B of the locking part 172B covers the movable ring 173 from a side of the movable ring 173 opposite to the base part 171B in the axial direction. Thereby, the movable ring 173 is sandwiched between the base part 171B and the flange part 202B of the locking part 172B in the axial direction.

The ring support part 310 of the movable ring support body 211B and the movable ring 173 attached to the ring support part 310 constitute a partition piston 143B. In the axial direction of the partition piston 143B, a length of the movable ring 173 is smaller than a distance between the base part 171B and the flange part 202B. Therefore, the movable ring 173 is movable in the axial direction between the base part 171B and the flange part 202B.

As described above, the movable ring 173 is movable in the axial direction between the base part 171B and the flange part 202B. When the movable ring 173 is separated from the base part 171B in the axial direction, it opens a passage 210B formed of passages in the plurality of passage grooves 205B of the locking part 172B, a passage between the movable ring 173 and the cylindrical part 183B of the locking part 172B, and a passage between the movable ring 173 and the base part 171B. The movable ring 173 closes the passage 210B when it comes into contact with the base part 171B in the axial direction.

The partition piston 143B is supported by a bottom member 12 of the tube 3 via the support cylindrical part 142B, the support base part 141B, and the seat member 32 of the body valve assembly 31. In other words, the support cylindrical part 142B having a diameter smaller than that of the first cylinder 101 is provided on the body valve assembly 31 via the support base part 141B to support the partition piston 143B.

A portion surrounded by the body valve assembly 31, the support base part 141B, the support cylindrical part 142B, and the base part 171B of the ring support part 310 is defined as a second cylinder inner chamber 213. The second cylinder inner chamber 213 communicates with a portion between the tube 3 of the second chamber 20 and the first cylinder 101 and a portion between the tube 3 of the second chamber 20 and the support cylindrical part 142B via passages in the communication holes 162B of the support base part 141B. The second cylinder inner chamber 213 forms a part of the second chamber 20. In other words, the communication holes 162B forming the second cylinder inner chamber 213, which is a part of the second chamber 20, in the support cylindrical part 142B are provided in the support base part 141B. The communication passage 208B of the support cylindrical part 142B allows the second cylinder inner chamber 213 in the support cylindrical part 142B to communicate with the outside of the support cylindrical part 142B. If there is air in the second cylinder inner chamber 213 inside the movable ring support body 211B, the communication passage 208B can cause the air to flow to the outside of the movable ring support body 211B.

The partition piston 143B enters the first cylinder 101 from below through an opening at a lower end of the first cylinder 101 and exits therefrom downward.

Here, when a piston rod 21 is in a first predetermined range in which a cup 100 including the first cylinder 101 is disposed on an upper side of the partition piston 143B and the cup 100 is not yet fitted to the partition piston 143B, the inside of the cup 100 serves as the second chamber 20 as a whole.

From this state, in a compression stroke, the piston rod 21 moves to a second predetermined range on the support base part 141B side with respect to the first predetermined range. Then, the cup 100, which moves integrally with the piston rod 21, covers the partition piston 143B to cause the movable ring 173 of the partition piston 143B to enter the inside of an enlarged diameter part 112 of the first cylinder 101, and then cause the movable ring 173 to be fitted into the main body part 111 of the first cylinder 101. At the beginning of the fitting, the movable ring 173 is pressed against the base part 171B of the movable ring support body 211B by a frictional force with the first cylinder 101 that comes in contact therewith, thereby closing the passage 210B. In the subsequent compression stroke, the movable ring 173 slides inside the first cylinder 101 to approach a support piston 81 while maintaining the state of being pressed against the base part 171B and closing the passage 210B as described above.

When the first cylinder 101 is fitted to the movable ring 173 of the partition piston 143B, the second chamber 20 is divided into a first cylinder inner chamber 214 inside the first cylinder 101 and a cylinder outer chamber 215 outside the first cylinder 101. The first cylinder inner chamber 214 is a portion inside the first cylinder 101 between a relief valve assembly 62 and the partition piston 143B. The cylinder outer chamber 215 is a portion of the second chamber 20 excluding the first cylinder inner chamber 214. The passage 210B of the partition piston 143B is a passage that allows communication between the cylinder outer chamber 215 and the first cylinder inner chamber 214, and the movable ring 173 can open and close the passage 210B.

During the compression stroke in the second predetermined range, the cup 100 moves to the support base part 141B side together with the piston rod 21 while the movable ring 173 is brought into contact with the base part 171B and closes the passage 210B as described above. At an upper portion of the second predetermined range, as in the upper portion of the second predetermined range in the first embodiment, the movable ring 173 is at a position of a plurality of grooves 116 provided in the first cylinder 101 to allow an oil fluid L to flow from the first cylinder inner chamber 214 to the cylinder outer chamber 215 through passages in the plurality of grooves 116. At that time, as the cup 100 approaches the support base part 141B, among the plurality of grooves 116, the number of the grooves 116 that allow the oil fluid L to flow from the first cylinder inner chamber 214 to the cylinder outer chamber 215 decreases and finally becomes zero. Thereby, the cup 100 including the first cylinder 101 and the partition piston 143B increase generation of the damping force in stages. At a position in which the number of the grooves 116 that allow the oil fluid L to flow from the first cylinder inner chamber 214 to the cylinder outer chamber 215 is zero, the movable ring 173 is fitted to the main body part 111 of the first cylinder 101 and closes the passage 210B to the maximum. In the subsequent compression stroke, the movable ring 173 slides in the first cylinder 101 to approach the support piston 81 in a state in which the passage 210B remains closed to the maximum as described above. In other words, the movable ring 173 closes the passage 210B when a piston assembly 17 moves to the second chamber 20 side.

The relief valve assembly 62, the first cylinder 101 connected to the relief valve assembly 62, and the partition piston 143B constitute a damping force increasing mechanism 221B that increases the damping force in addition to the damping force generated by the piston assembly 17 when the piston assembly 17 moves to the second chamber 20 side. The damping force increasing mechanism 221B includes the partition piston 143B that enters the inside of the first cylinder 101 to form the first cylinder inner chamber 214 in the first cylinder 101 when the piston assembly 17 moves to the second chamber 20 side.

Also, during the compression stroke in the second predetermined range, the cup 100 moves to the support base part 141B side while the partition piston 143B closes the passage 210B as described above. At that time, a relief valve 82 opens depending on a piston speed which is a moving speed of the piston rod 21, the piston 18, and the support piston 81 with respect to the tube 3.

During an extension stroke in the second predetermined range, the cup 100, together with the piston rod 21, moves in a direction away from the support base part 141B. Then, the movable ring 173 of the partition piston 143B is separated from the base part 171B in the axial direction by the frictional force with the first cylinder 101, thereby opening the passage 210B. In the subsequent extension stroke, the cup 100 moves in a direction away from the support base part 141B while the passage 210B remains open due to the movable ring 173. When the cup 100 moves in a direction away from the support base part 141B, the oil fluid L is allowed to flow from a portion of the cylinder outer chamber 215 between the first cylinder 101 and the support cylindrical part 142B to the first cylinder inner chamber 214 through the passage 210B. Thereby, the damping force on the movement of the piston rod 21 in the extension direction is reduced.

In the extension stroke from a state in which the movable ring 173 is on the support piston 81 side with respect to all the grooves 116 in the first cylinder 101, when the cup 100 separates the support piston 81 from the movable ring 173 by a predetermined distance, the movable ring 173 is positioned at a position of the grooves 116 provided in the first cylinder 101 to open the grooves 116 to the first cylinder inner chamber 214. Then, in addition to the flow through the passage 210B, the oil fluid L flows from the cylinder outer chamber 215 to the first cylinder inner chamber 214 through the passages in the grooves 116 to reduce the damping force on the movement of the piston rod 21 in the extension direction. At that time, the plurality of grooves 116 reduce the damping force on the movement of the piston rod 21 in the extension direction in stages.

Next, main operations of the shock absorber 1B different from those of the shock absorber 1 will be described.

"Compression Stroke in which Piston Rod 21 is in Second Predetermined Range"

In this compression stroke, the piston assembly 17 operates in the same manner as in the first predetermined range. In addition, the cup 100 of the damping force increasing mechanism 221B moves in a direction toward the support base part 141B in the axial direction of the tube 3 to cause the movable ring 173 of the partition piston 143B to be fitted into the first cylinder 101. Then, at the beginning thereof, the movable ring 173 is pressed against the base part 171B to close the passage 210B.

In this state, the cup 100 moves in a direction toward the support base part 141B. Then, the oil fluid L in the first cylinder inner chamber 214 is squeezed by the plurality of grooves 116 provided in the first cylinder 101 and flows into the cylinder outer chamber 215. Thereby, generation of the damping force by the damping force increasing mechanism 221B increases. At that time, as the cup 100 approaches the support base part 141B, among the plurality of grooves 116, the number of the grooves 116 that allow the oil fluid L to flow from the first cylinder inner chamber 214 to the cylinder outer chamber 215 decreases and finally becomes zero. Thereby, the damping force generated by the damping force increasing mechanism 221B increases in stages, and the damping force on the movement of the piston rod 21 in the compression direction increases in stages. An amount of the damping force generated by the damping force increasing mechanism 221B in this way increases in addition to the damping force generated by the piston assembly 17. Here, at a position in which the number of the grooves 116 allowing the oil fluid L to flow from the first cylinder inner chamber 214 to the cylinder outer chamber 215 is zero, the movable ring 173 is fitted to the main body part 111 of the first cylinder 101 and closes the passage 210B to the maximum. Therefore, in the compression stroke after the number of the grooves 116 that allow the oil fluid L to flow from the first cylinder inner chamber 214 to the cylinder outer chamber 215 is made zero by the movable ring 173, the oil fluid L flowing from the first cylinder inner chamber 214 to the cylinder outer chamber 215 through a space between the first cylinder 101 and the partition piston 143B is squeezed to the maximum. Therefore, the damping force is further increased.

Here, when the cup 100 moves in a direction toward the support base part 141B, the relief valve 82 of the relief valve assembly 62 opens depending on a piston speed. Then, the oil fluid L flows from the first cylinder inner chamber 214 to the cylinder outer chamber 215 through passages in a plurality of passage holes 85. Thereby, an excessive increase in pressure in the first cylinder inner chamber 214 is suppressed.

"Extension Stroke in which Piston Rod 21 is in Second Predetermined Range"

In this extension stroke, the piston assembly 17 operates in the same manner as in the first predetermined range. Then, the cup 100 of the damping force increasing mechanism 221B moves in a direction away from the support base part 141B in the axial direction of the tube 3. Then, at the beginning thereof, the movable ring 173 opens the passage 210B.

With the passage 210B opened in this way, the cup 100 moves in a direction away from the support base part 141B. Then, the oil fluid L in the cylinder outer chamber 215 flows into the first cylinder inner chamber 214 from the portion between the first cylinder 101 and the support cylindrical part 142B through the passage 210B. When the movable ring 173 passes through the position of the grooves 116 provided in the first cylinder 101 from a state in which it is on a side opposite to the support base part 141B with respect to all the grooves 116 provided in the first cylinder 101, the oil fluid L flows from the cylinder outer chamber 215 to the first cylinder inner chamber 214 through the passages in the grooves 116 in addition to the flow through the passage 210B. At that time, as the cup 100 becomes further away from the support base part 141B, among the plurality of grooves 116, the number of the grooves 116 that allow the oil fluid L to flow from the cylinder outer chamber 215 to the first cylinder inner chamber 214 increases. Thereby, the damping force on the movement of the piston rod 21 in the extension direction is reduced in stages.

The shock absorber 1B of the third embodiment includes the damping force increasing mechanism 221B that increases the damping force when the piston assembly 17 moves to the second chamber 20 side. Then, the damping force increasing mechanism 221B of the shock absorber 1B includes the first cylinder 101 connected to the first end portion 22 side of the piston rod 21 with respect to the piston assembly 17, and the partition piston 143B that enters the inside of the first cylinder 101 to form the first cylinder inner chamber 214 in the first cylinder 101 when the piston assembly 17 moves to the second chamber 20 side.

As described above, in the shock absorber 1B, the first cylinder 101, which allows the partition piston 143B to enter and form the first cylinder inner chamber 214 therein when the piston assembly 17 moves to the second chamber 20 side, is connected to the first end portion 22 side of the piston rod 21 with respect to the piston assembly 17. Therefore, the shock absorber 1B can be simplified in structure, and increase in cost can be curbed. For example, if a stroke position for increasing the damping force of the piston rod 21 is to be changed, it need only change a position of the partition piston 143B, and therefore increase in cost can be curbed.

In the shock absorber 1B, the movable ring support body 211B supporting the movable ring 173 is provided in the body valve assembly 31 provided on a side of the second chamber 20 opposite to the piston assembly 17. Therefore, the partition piston 143B can be supported with a simple structure.

In the shock absorber 1B, since the partition piston 143B is supported by the support cylindrical part 142B having a smaller diameter than the first cylinder 101, the partition piston 143B can be stably supported.

In the shock absorber 1B, the communication passage 208B through which air inside the support cylindrical part 142B is allowed to flow is provided in the support cylindrical part 142B. Therefore, the shock absorber 1B can smoothly discharge the air inside the support cylindrical part 142B to the outside of the movable ring support body 211B when the oil fluid L is filled into the tube 3.

In the shock absorber 1B, the partition piston 143B includes the passage 210B that allows communication between the cylinder outer chamber 215 and the first cylinder inner chamber 214 in the second chamber 20, and the movable ring 173 that opens the passage 210B when the piston assembly 17 moves to a first chamber 19 side and closes the passage 210B when the piston assembly 17 moves to the second chamber 20 side. Therefore, the shock absorber 1B can smoothly reduce the damping force of the damping force increasing mechanism 221B during the extension stroke even if the damping force is increased by the damping force increasing mechanism 221B during the compression stroke.

In the shock absorber 1B, the movable ring support body 211B supporting the movable ring 173 is integrally formed by injection forming of a synthetic resin material. Therefore, reduction in costs of the shock absorber 1B can be achieved.

Fourth Embodiment

Figure 9:
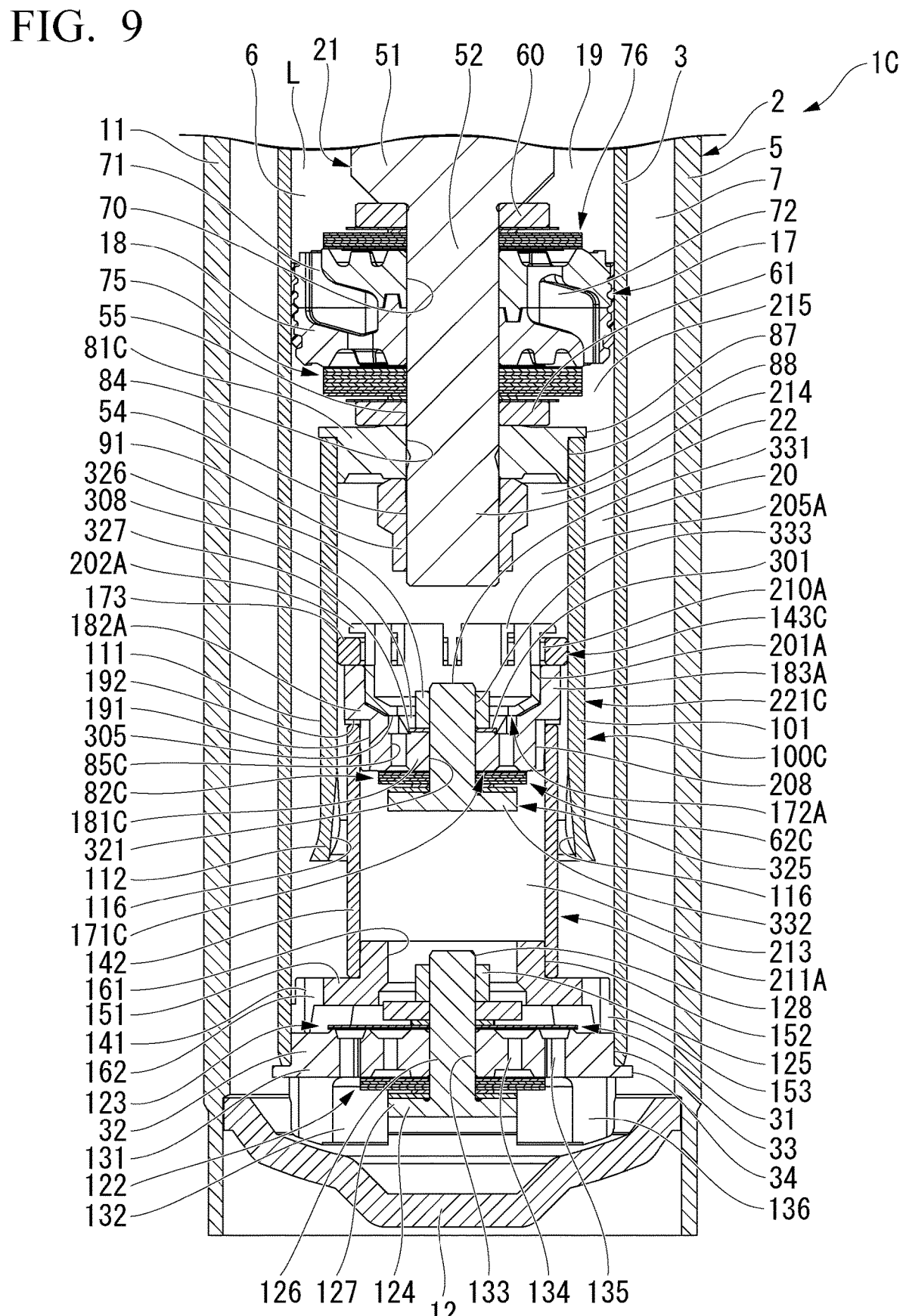
FIG. 9 is a cross-sectional view of a main part illustrating a shock absorber of a fourth embodiment according to the present invention.

Next, a shock absorber of a fourth embodiment will be described mainly on the basis of FIGS. 9 and 10, focusing on differences from the second embodiment. Further, parts common to those in the second embodiment are denoted by the same terms and the same reference signs.

A shock absorber 1C of the fourth embodiment includes a damping force increasing mechanism 221C, which is partially different from the damping force increasing mechanism 221A, instead of the damping force increasing mechanism 221A. In the damping force increasing mechanism 221C, the relief valve assembly 62 is not provided in a piston rod 21, and a support piston 81C, which is partially different from the support piston 81, is provided in the piston rod 21 instead of the support piston 81. The support piston 81C differs from the support piston 81 in that the passage hole 85 is not formed. In the damping force increasing mechanism 221C, the relief valve 82 is not provided between the support piston 81C and an intervening member 61.

A first end portion 22 of the piston rod 21 protrudes from the support piston 81C to a side of the piston rod 21 opposite to a piston assembly 17 in an axial direction. Then, a nut 91 is screwed onto a male screw 54 formed on an outer circumferential portion of the first end portion 22. Thereby, an intervening member 60, a second damping valve 76, a piston 18, a first damping valve 75, the intervening member 61, and the support piston 81C are axially clamped by a main shaft part 51 and the nut 91 at least at their inner circumferential sides. The support piston 81C is fixed to the piston rod 21.

A first cylinder 101 is attached to the support piston 81C in the same manner as the attachment to the support piston 81. The damping force increasing mechanism 221C includes a cup 100C, which differs from the cup 100 in that the support piston 81C is provided therein instead of the support piston 81, instead of the cup 100.

The damping force increasing mechanism 221C includes a partition piston 143C, which is partially different from the partition piston 143A, instead of the partition piston 143A. The partition piston 143C includes a base member 171C, which is partially different from the base member 171A, instead of the base member 171A. The base member 171C includes a main body part 181C, which is partially different from the main body part 181A, instead of the main body part 181A.

The base member 171C includes the same connection part 182A and cylindrical part 183A similar to those of the base member 171. A through hole 321 is formed in the base member 171C at a center of the main body part 181C in a radial direction. The through hole 321 penetrates the main body part 181C in the axial direction of the main body part 181C. A passage hole 85C is formed in the base member 171C on an outer side of the through hole 321 in the radial direction of the main body part 181C. The passage hole 85C penetrates the main body part 181C in the axial direction of the main body part 181C. A plurality of passage holes 85C are formed in the main body part 181C. The plurality of passage holes 85C are disposed at intervals in a circumferential direction of the main body part 181C. The plurality of passage holes 85C are disposed on an inner side of the connection part 182A in the radial direction of the base member 171C.

Figure 10:
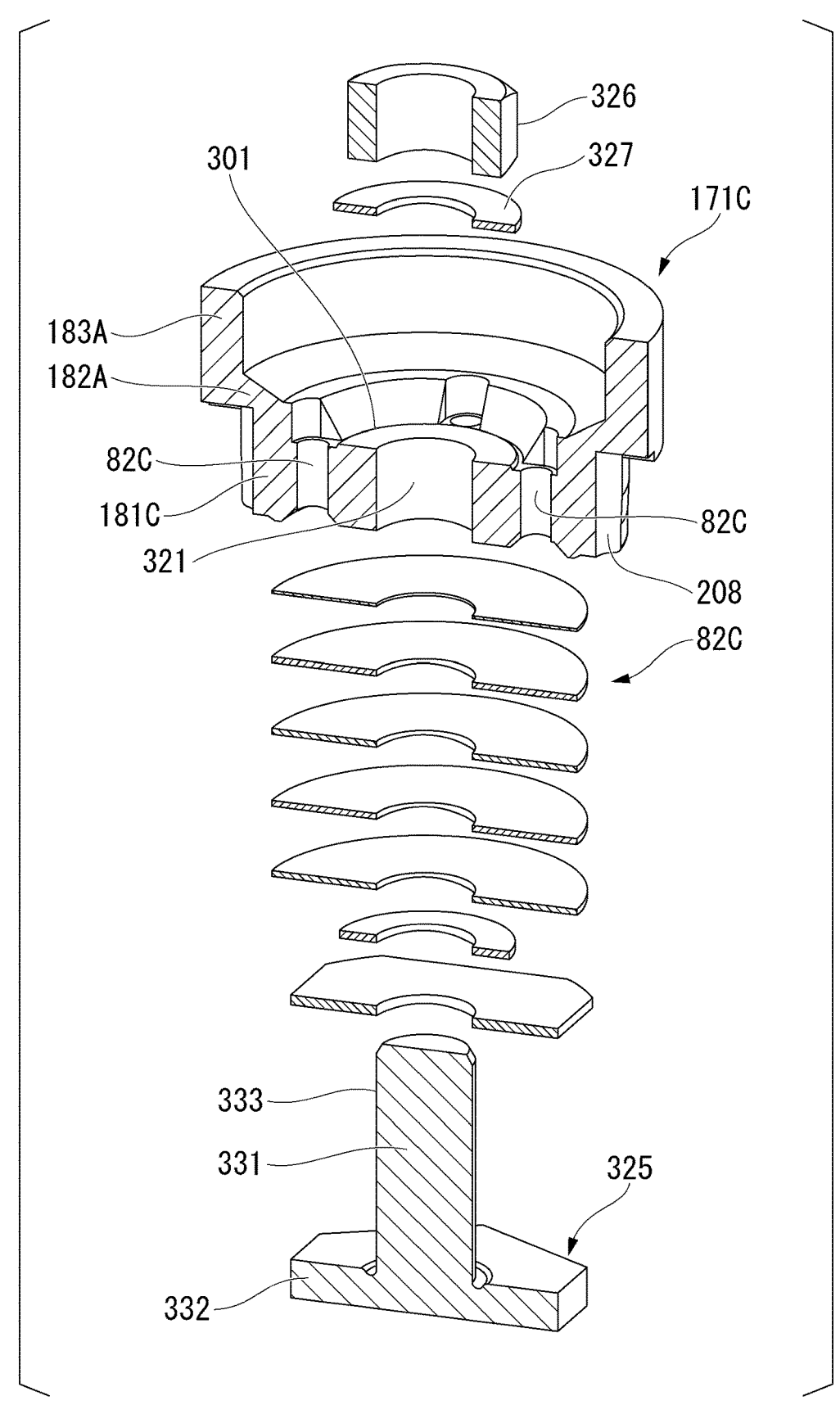
FIG. 10 is an exploded perspective view illustrating a part of a partition piston of the shock absorber of the fourth embodiment according to the present invention.

As illustrated also in FIG. 10, the partition piston 143C includes a relief valve 82C, an attachment bolt 325, an attachment nut 326, and a washer 327.

The attachment bolt 325 has a shaft portion 331 and a head portion 332. The shaft portion 331 has an outer diameter smaller than an outer diameter of the head portion 332. The shaft portion 331 has a male screw 333 formed on an outer circumferential portion on a side opposite to the head portion 332 in the axial direction.

The relief valve 82C is a disc valve formed by laminating a plurality of annular discs. As illustrated in FIG. 9, the relief valve 82C is disposed on a side opposite to a locking member 172A in the axial direction of the base member 171C.

As illustrated also in FIG. 10, the shaft portion 331 of the attachment bolt 325 is inserted into a radial inner side of the relief valve 82C, the through hole 321 of the base member 171C, and the washer 327 from a side opposite to the base member 171C in the axial direction of the relief valve 82C. Then, the attachment nut 326 is screwed onto the male screw 333 of the shaft portion 331 protruding from the locking member 172A. Thereby, as illustrated in FIG. 9, a portion of the relief valve 82C on a radially inner side, a portion of the base member 171C on a radially inner side, and the washer 327 are clamped by the head portion 332 of the attachment bolt 325 and the attachment nut 326. A portion of the relief valve 82C on an outer circumferential side closes passages in the plurality of passage holes 85C by coming into contact with the base member 171C. The portion of the relief valve 82C on the outer circumferential side opens the passages in the plurality of passage holes 85C by being separated from the base member 171C. The head portion 332 of the attachment bolt 325 has higher rigidity than the discs constituting the relief valve 82C. The head portion 332 of the attachment bolt 325 suppresses excessive deformation of the relief valve 82C. The base member 171C, the relief valve 82C, the attachment bolt 325, the washer 327, and the attachment nut 326 constitute a relief valve assembly 62C.

The base member 171C of the partition piston 143C is fixed to a second cylinder 142 at the main body part 181C in the same manner as the main body part 181A of the base member 171A.

In the partition piston 143C, a movable ring 173 and the locking member 172A are attached to the base member 171C that is in a state of being fixed to the second cylinder 142 as described above in the same manner as the attachment of the movable ring 173 and the locking member 172A to the base member 171A. Thereby, the movable ring 173 is sandwiched between the cylindrical part 183A of the base member 171C and a flange part 202A of the locking member 172A in the axial direction.

The relief valve assembly 62C, together with the partition piston 143C, is supported by a body valve assembly 31 via the second cylinder 142.

The partition piston 143C is supported by a bottom member 12 of a tube 3 via the second cylinder 142, a base adapter 141, and a seat member 32 of the body valve assembly 31. In other words, the second cylinder 142 having a smaller diameter than the first cylinder 101 is provided above the body valve assembly 31 via the base adapter 141 to support the partition piston 143C. The partition piston 143C and a partition piston support body 211A are provided in a second chamber 20.

In the shock absorber 1C, a first cylinder inner chamber 214 formed by fitting the first cylinder 101 to the movable ring 173 of the partition piston 143C is a portion inside the first cylinder 101 between the support piston 81C and the partition piston 143C. A cylinder outer chamber 215 is a portion of the second chamber 20 excluding the first cylinder inner chamber 214. In the shock absorber 1C, a portion surrounded by the body valve assembly 31, the base adapter 141, the second cylinder 142, and the partition piston 143C is defined as a second cylinder inner chamber 213.

In the shock absorber 1C, compared to the shock absorber 1A, the damping force increasing mechanism 221C operates in the same manner as the damping force increasing mechanism 221A of the second embodiment except for the following points.

In the damping force increasing mechanism 221A of the second embodiment, in the compression stroke in which the piston rod 21 is in the second predetermined range, the relief valve 82 of the relief valve assembly 62 opens depending on a piston speed to allow the oil fluid L to flow from the first cylinder inner chamber 214 to the cylinder outer chamber 215 through the passages in the plurality of passage holes 85. Thereby, the damping force increasing mechanism 221A of the second embodiment suppresses an excessive increase in pressure in the first cylinder inner chamber 214.

On the other hand, in the damping force increasing mechanism 221C of the fourth embodiment, the relief valve 82C of the relief valve assembly 62C opens depending on a piston speed to allow the oil fluid L to flow from the first cylinder inner chamber 214 to the second cylinder inner chamber 213 of the cylinder outer chamber 215 through the passages in the plurality of passage holes 85C, thereby suppressing an excessive increase in pressure in the first cylinder inner chamber 214. The relief valve 82C allows the oil fluid L to flow from the first cylinder inner chamber 214 to the cylinder outer chamber 215 while generating the damping force by suppressing a flow of the oil fluid L through the passages in the plurality of passage holes 85C that occurs during the compression stroke. Here, the relief valve 82C has higher rigidity than the second damping valve 76 and is difficult to open. Therefore, the relief valve 82C opens later than the second damping valve 76 and generates a higher damping force than the second damping valve 76.

The shock absorber 1C of the fourth embodiment includes the damping force increasing mechanism 221C that increases the damping force when the piston assembly 17 moves to the second chamber 20 side. Then, the damping force increasing mechanism 221C of the shock absorber 1C includes the first cylinder 101 connected to the first end portion 22 side of the piston rod 21 with respect to the piston assembly 17, and the partition piston 143C that enters the inside of the first cylinder 101 to form the first cylinder inner chamber 214 in the first cylinder 101 when the piston assembly 17 moves to the second chamber 20 side.

As described above, in the shock absorber 1C, the first cylinder 101, which allows the partition piston 143C to enter and form the first cylinder inner chamber 214 therein when the piston assembly 17 moves to the second chamber 20 side, is connected to the first end portion 22 side of the piston rod 21 with respect to the piston assembly 17. Therefore, the shock absorber 1C can be simplified in structure, and increase in cost can be curbed. For example, if a stroke position for increasing the damping force of the piston rod 21 is to be changed, it need only change a position of the partition piston 143C, and therefore increase in cost can be curbed.

In the shock absorber 1C, the second cylinder 142 supporting the partition piston 143C is provided in the body valve assembly 31 provided on a side of the second chamber 20 opposite to the piston assembly 17. Therefore, the partition piston 143C can be supported with a simple structure.

In the shock absorber 1C, since the partition piston 143C is supported by the second cylinder 142 having a smaller diameter than the first cylinder 101, the partition piston 143C can be stably supported. Further, it is also possible to support the partition piston 143C with a shaft portion 126 of a bolt 124 of the body valve assembly 31 by extending the shaft portion 126 to the piston assembly 17 side.

In the shock absorber 1C, a communication passage 208 through which air in the second cylinder 142 is allowed to flow is provided between the partition piston 143C and the second cylinder 142. Therefore, the shock absorber 1C can smoothly discharge the air in the second cylinder 142 to the outside of the second cylinder 142 when the oil fluid L is filled into the tube 3.

In the shock absorber 1C, the partition piston 143C includes a passage 210A that allows communication between the cylinder outer chamber 215 and the first cylinder inner chamber 214 in the second chamber 20, and the movable ring 173 that opens the passage 210A when the piston assembly 17 moves to the first chamber 19 side and closes the passage 210A when the piston assembly 17 moves to the second chamber 20 side. Therefore, the shock absorber 1C can smoothly reduce the damping force of the damping force increasing mechanism 221C during the extension stroke even if the damping force is increased by the damping force increasing mechanism 221C during the compression stroke.

In the shock absorber 1C of the fourth embodiment, the partition piston 143C includes a recess-shaped part 308 that is recessed to the second cylinder 142 side in the axial direction at a center in the radial direction. Therefore, in the shock absorber 1C, a weight of the partition piston 143C can be reduced.

Since the shock absorber 1C of the fourth embodiment includes the relief valve 82C provided in the partition piston 143C, a length of the piston rod 21 in the axial direction can be reduced.

Fifth Embodiment

Next, a shock absorber of a fifth embodiment will be described mainly on the basis of FIGS. 11 and 12, focusing on differences from the second and fourth embodiments. Further, parts common to those in the second and fourth embodiments are denoted by the same terms and the same reference signs.

A shock absorber 1D of the fifth embodiment includes a damping force increasing mechanism 221D, which is partially different from the damping force increasing mechanisms 221A and 221C, instead of the damping force increasing mechanisms 221A and 221C. The damping force increasing mechanism 221D includes a support piston 81C, which is similar to that in the damping force increasing mechanism 221C, provided on a piston rod 21. A first cylinder 101 is attached to the support piston 81C of the damping force increasing mechanism 221D. Therefore, a cup 100C is provided in the damping force increasing mechanism 221D.

The damping force increasing mechanism 221D includes a partition piston 143D, which is partially different from the partition piston 143A, instead of the partition piston 143A. The partition piston 143D includes a base member 171D, which is partially different from the base member 171A, instead of the base member 171. The base member 171D includes a main body part 181D, which is partially different from the main body part 181A, instead of the main body part 181A.

The base member 171D includes a connection part 182A and a cylindrical part 183A similar to those of the base member 171A. In the base member 171D, a through hole 321D is formed at a center of the main body part 181D in a radial direction. The through hole 321D penetrates the main body part 181D in an axial direction of the main body part 181D. The through hole 321D is disposed on an inner side of the connection part 182A in the radial direction of the base member 171D.

The shock absorber 1D includes a body valve assembly 31D, which is partially different from the body valve assembly 31, instead of the body valve assembly 31. The damping force increasing mechanism 221D includes a relief valve 82D provided in the body valve assembly 31D. The relief valve 82D is a disc valve formed by laminating a plurality of annular discs. The relief valve 82D is disposed on a side of a disc valve 123 opposite to a seat member 32 in the axial direction of the seat member 32. As illustrated in FIG. 12, a shaft portion 126 of a bolt 124 is inserted into the disc valve 122, the seat member 32, the disc valve 123, and the relief valve 82D from below. In this state, a nut 125 is screwed onto a male screw 128 of the bolt 124. Thereby, the bolt 124 and the nut 125 attach the disc valve 122, the disc valve 123, and the relief valve 82D to the seat member 32.

Figure 11:
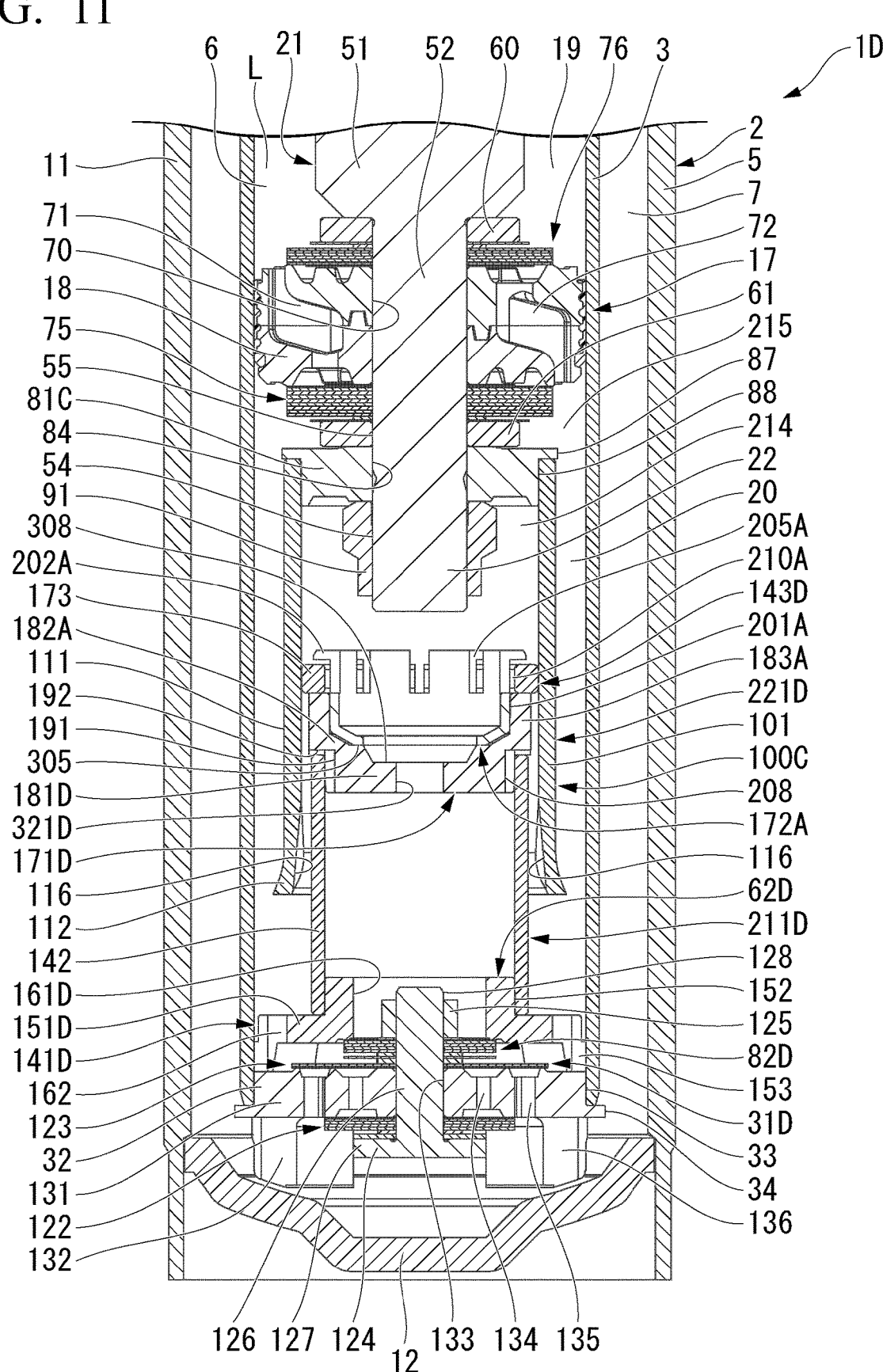
FIG. 11 is a cross-sectional view of a main part illustrating a shock absorber of a fifth embodiment according to the present invention.
Figure 12:
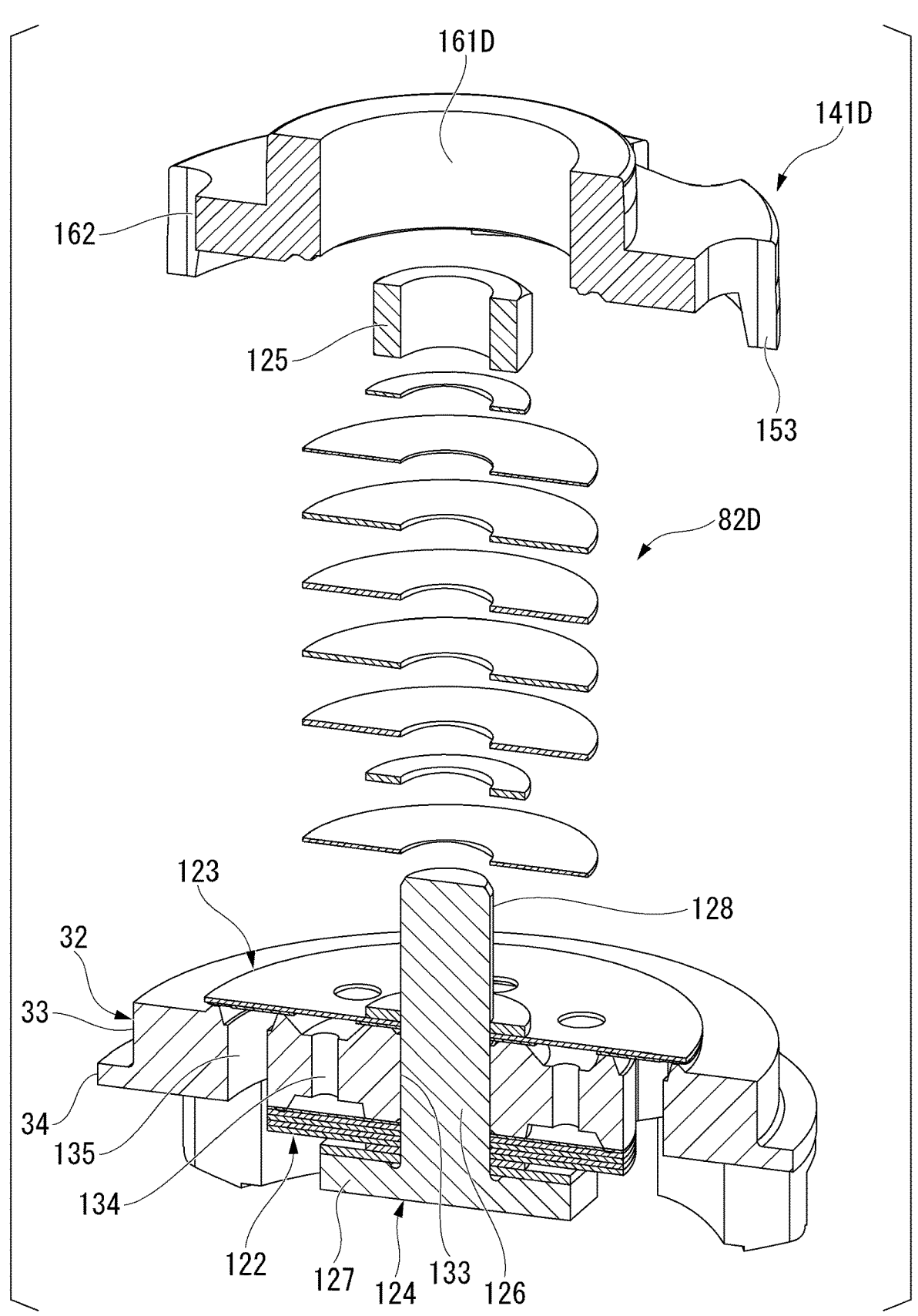
FIG. 12 is an exploded perspective cross-sectional view illustrating a body valve assembly of the shock absorber of the fifth embodiment according to the present invention.

As illustrated in FIG. 11, the shock absorber 1D includes a partition piston support body 211D, which is partially different from the partition piston support body 211A, instead of the partition piston support body 211A. The partition piston support body 211D includes a base adapter 141D, which is partially different from the base adapter 141, instead of the base adapter 141. The base adapter 141D includes a main plate part 151D, which is partially different from the main plate part 151, instead of the main plate part 151. The main plate part 151D includes a through hole 161D formed at a center in the radial direction thereof to penetrate the main plate part 151D and a press-fitting part 152 in the axial direction thereof.

A portion of the relief valve 82D on an outer circumferential side closes a passage in the through hole 161D of the main plate part 151D by coming into contact with a side of the main plate part 151D of the base adapter 141D opposite to the press-fitting part 152 in the axial direction. The relief valve 82D opens the passage in the through hole 161D when the portion on the outer circumferential side is separated from the main plate part 151D. The base adapter 141D and the relief valve 82D constitute a relief valve assembly 62D. The relief valve 82D is incorporated in the body valve assembly 31D.

The partition piston 143D is supported by a bottom member 12 of a tube 3 via a second cylinder 142, the base adapter 141D, and the seat member 32 of the body valve assembly 31D. In other words, the second cylinder 142 having a smaller diameter than the first cylinder 101 is provided above the body valve assembly 31D via the base adapter 141D to support the partition piston 143D. The partition piston 143D and the partition piston support body 211D are provided in the second chamber 20.

In the shock absorber 1D, a first cylinder inner chamber 214 formed by fitting the first cylinder 101 to a movable ring 173 of the partition piston 143D is formed of a portion inside the first cylinder 101 between the support piston 81C and the partition piston 143D, a portion inside the through hole 321D of the partition piston 143D, a portion inside the second cylinder 142, and a portion inside the through hole 161D of the base adapter 141D. A cylinder outer chamber 215 is a portion of the second chamber 20 excluding the first cylinder inner chamber 214. A passage 210A of the partition piston 143 is a passage that allows communication between the cylinder outer chamber 215 and the first cylinder inner chamber 214, and the movable ring 173 can open and close the passage 210A.

In the shock absorber 1D, compared to the shock absorber 1A, the damping force increasing mechanism 221D operates in the same manner as the damping force increasing mechanism 221A of the second embodiment except for the following points.

In the damping force increasing mechanism 221A of the second embodiment, in the compression stroke in which the piston rod 21 is in the second predetermined range, the relief valve 82 of the relief valve assembly 62 opens depending on a piston speed to allow the oil fluid L to flow from the first cylinder inner chamber 214 to the cylinder outer chamber 215 through the passages in the plurality of passage holes 85. Thereby, the damping force increasing mechanism 221A of the second embodiment suppresses an excessive increase in pressure in the first cylinder inner chamber 214.

On the other hand, in the damping force increasing mechanism 221D, the relief valve 82D of the body valve assembly 31D opens depending on a piston speed to allow an oil fluid L to flow from the first cylinder inner chamber 214 to the cylinder outer chamber 215 through the passage in the through hole 161D of the base adapter 141D, thereby suppressing an excessive increase in pressure in the first cylinder inner chamber 214. The relief valve 82D allows the oil fluid L to flow from the first cylinder inner chamber 214 to the cylinder outer chamber 215 while generating the damping force by suppressing a flow of the oil fluid L through the passage in the through hole 161D that occurs during a compression stroke. Here, the relief valve 82D has higher rigidity than a second damping valve 76 and is difficult to open. Therefore, the relief valve 82D opens later than the second damping valve 76 and generates a higher damping force than the second damping valve 76.

The shock absorber 1D of the fifth embodiment includes the damping force increasing mechanism 221D that increases the damping force when a piston assembly 17 moves to the second chamber 20 side. Then, the damping force increasing mechanism 221D of the shock absorber 1D includes the first cylinder 101 connected to the first end portion 22 side of the piston rod 21 with respect to the piston assembly 17, and the partition piston 143D that enters the inside of the first cylinder 101 to form the first cylinder inner chamber 214 in the first cylinder 101 when the piston assembly 17 moves to the second chamber 20 side.

As described above, in the shock absorber 1D, the first cylinder 101, which allows the partition piston 143D to enter and form the first cylinder inner chamber 214 therein when the piston assembly 17 moves to the second chamber 20 side, is connected to the first end portion 22 side of the piston rod 21 with respect to the piston assembly 17. Therefore, the shock absorber 1D can be simplified in structure, and increase in cost can be curbed. For example, if a stroke position for increasing the damping force of the piston rod 21 is to be changed, it need only change a position of the partition piston 143D, and therefore increase in cost can be curbed.

In the shock absorber 1D, the second cylinder 142 supporting the partition piston 143D is provided in the body valve assembly 31D provided on a side of the second chamber 20 opposite to the piston assembly 17. Therefore, the partition piston 143D can be supported with a simple structure.

In the shock absorber 1D, since the partition piston 143D is supported by the second cylinder 142 having a smaller diameter than the first cylinder 101, the partition piston 143D can be stably supported. Further, it is also possible to support the partition piston 143D with the shaft portion 126 of the bolt 124 of the body valve assembly 31D by extending the shaft portion 126 to the piston assembly 17 side.

In the shock absorber 1D, a communication passage 208 through which air in the second cylinder 142 is allowed to flow is provided between the partition piston 143D and the second cylinder 142. Therefore, the shock absorber 1D can smoothly discharge the air in the second cylinder 142 to the outside of the second cylinder 142 when the oil fluid L is filled into the tube 3.

In the shock absorber 1D, the partition piston 143D includes the passage 210A that allows communication between the cylinder outer chamber 215 and the first cylinder inner chamber 214 in the second chamber 20, and the movable ring 173 that opens the passage 210A when the piston assembly 17 moves to the first chamber 19 side and closes the passage 210A when the piston assembly 17 moves to the second chamber 20 side. Therefore, the shock absorber 1D can smoothly reduce the damping force of the damping force increasing mechanism 221D during the extension stroke even if the damping force is increased by the damping force increasing mechanism 221D during the compression stroke.

In the shock absorber 1D of the fifth embodiment, the partition piston 143D includes a recess-shaped part 308 that is recessed to the second cylinder 142 side in the axial direction at a center in the radial direction. Therefore, in the shock absorber 1D, a weight of the partition piston 143D can be reduced.

Since the shock absorber 1D of the fifth embodiment includes the relief valve 82D provided in the body valve assembly 31D, a length of the piston rod 21 in the axial direction can be reduced.

Sixth Embodiment

Figure 13:
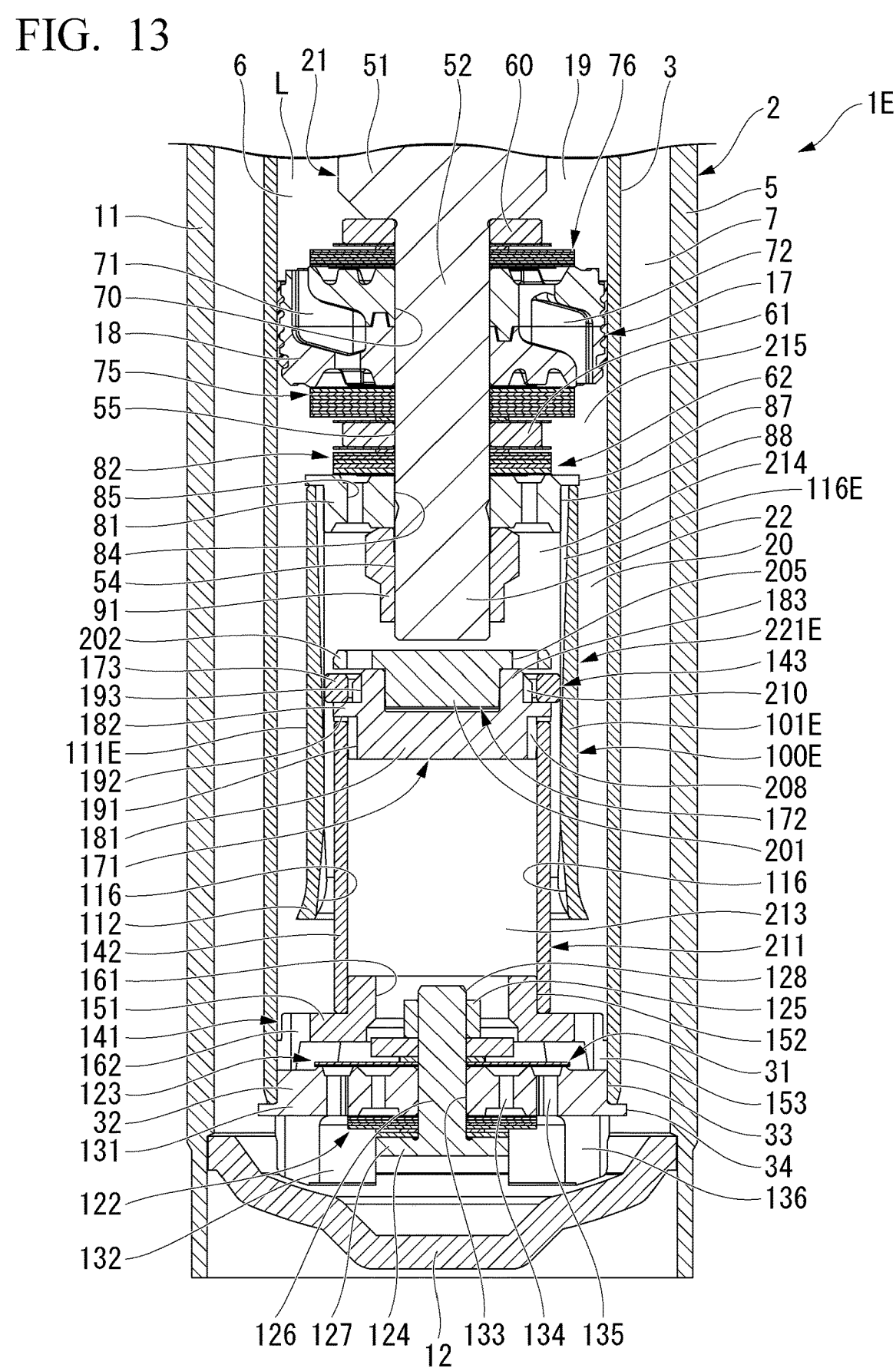
FIG. 13 is a cross-sectional view of a main part illustrating a shock absorber of a sixth embodiment according to the present invention.

Next, a shock absorber of a sixth embodiment will be described mainly on the basis of FIG. 13, focusing on differences from the first embodiment. Further, parts common to those in the first embodiment are denoted by the same terms and the same reference signs.

A shock absorber 1E of the sixth embodiment includes a damping force increasing mechanism 221E, which is partially different from the damping force increasing mechanism 221, instead of the damping force increasing mechanism 221. The damping force increasing mechanism 221E includes a cup 100E, which is partially different from the cup 100, instead of the cup 100. The cup 101E includes a first cylinder 101E, which is partially different from the first cylinder 101, instead of the first cylinder 101. The first cylinder 101E includes a main body part 111E, which is partially different from the main body part 111, instead of the main body part 111.

Similarly to the first cylinder 101, the first cylinder 101E includes a plurality of grooves 116 provided to extend in an axial direction of the first cylinder 101E at an inner circumferential portion on one end side in the axial direction thereof. The first cylinder 101E also includes a groove 116E provided to extend in the axial direction of the first cylinder 101E at an inner circumferential portion on the other end side in the axial direction thereof. The groove 116E is provided in an inner circumferential portion of the first cylinder 101E on an upper end side. The groove 116E is recessed outward in the radial direction of the first cylinder 101E from an inner circumferential surface of the first cylinder 101E. A plurality of grooves 116E are provided in the first cylinder 101E at regular intervals in a circumferential direction of the first cylinder 101E. The plurality of grooves 116E have the same length from the upper end of the first cylinder 101E. In other words, the plurality of grooves 116E have the same length in the axial direction of the first cylinder 101E. The plurality of grooves 116E are formed in the main body part 111E.

An upper end portion of the first cylinder 101E is press-fitted into a small diameter part 88 of a support piston 81. At that time, an upper end portion of the support piston 81 comes into contact with a large diameter part 87. Thereby, the cup 100E is formed. The plurality of grooves 116E extend further downward from the small diameter part 88.

In a compression stroke of a second predetermined range, if the partition piston 143 of the damping force increasing mechanism 221E approaches close to a limit of the support piston 81 inside the cup 100E, a movable ring 173 of the partition piston 143 is positioned at a position of the plurality of grooves 116E provided in the first cylinder 101E. Then, an oil fluid L flows from the first cylinder inner chamber 214 to the cylinder outer chamber 215 through the plurality of grooves 116E provided in the first cylinder 101E. Thereby, the plurality of grooves 116E suppress an excessive increase in pressure in the first cylinder inner chamber 214.

From this state, the cup 100E moves to an extension side together with the piston rod 21. Then, the movable ring 173 opens a passage 210. In this state, when the cup 100E moves to the extension side together with the piston rod 21, the oil fluid L flows from the cylinder outer chamber 215 to the first cylinder inner chamber 214 through the passage 210. At the same time, the oil fluid L flows from the cylinder outer chamber 215 to the first cylinder inner chamber 214 through the plurality of grooves 116E. Thereby, a resistance force to movement of the piston rod 21 in an extension direction is reduced.

In a subsequent extension stroke, when the movable ring 173 of the partition piston 143 is positioned on a side opposite to the support piston 81 with respect to the grooves 116E in the first cylinder 101E, the oil fluid L flows from the cylinder outer chamber 215 into the first cylinder inner chamber 214 only through a flow path via the passage 210.

In the shock absorber 1E of the sixth embodiment, the grooves 116 extending in the axial direction of the first cylinder 101E are provided in the inner circumferential portion of the first cylinder 101E on one end side in the axial direction, and the grooves 116E extending in the axial direction of the first cylinder 101E are provided in the inner circumferential portion of the first cylinder 101E on the other end side in the axial direction. Thereby, at the beginning of the compression stroke in the second predetermined range, a rate of change in damping force becomes gentle due to the grooves 116 on the lower end side. Since there is no groove in the middle of the first cylinder 101E in the axial direction, the damping force increases at an intermediate position of the compression stroke in the second predetermined range. On a lower end side of the second predetermined range, an increase in damping force is suppressed by the grooves 116E. The grooves 116E can serve as a relief.

Further, in the embodiments, a hydraulic shock absorber has been illustrated as an example of the shock absorbers 1 and 1A to 1D, but the above-described structure can also be employed for a shock absorber using water or air as a working fluid.

BRIEF DESCRIPTION OF THE REFERENCE SYMBOLS

1, 1A to 1D Shock absorber
3 Tube
6 Inner chamber
17 Piston assembly
19 First chamber
20 Second chamber
21 Piston rod
22 First end portion (one end portion)
23 Second end portion (the other end portion)
31, 31D Body valve assembly
62 Relief valve assembly (valve assembly)
81 Support piston
82 Relief valve
101 First cylinder
142 Second cylinder (support member)
143, 143A to 143D Partition piston
173 Movable ring (movable member)
208 Communication passage
210, 210A Passage
214 First cylinder inner chamber (partition chamber)
221, 221A to 221D Damping force increasing mechanism

The invention claimed is:

1. A shock absorber comprising:

a tube having an inner chamber inside;

a piston rod having one end portion in an axial direction disposed in the tube and the other end portion in the axial direction disposed outside the tube;

a piston assembly connected to an intermediate position of the piston rod in the axial direction, dividing the inner chamber into a first chamber on the other end portion side of the piston rod and a second chamber on the one end portion side of the piston rod, and configured to generate a damping force when the piston rod moves;

a damping force increasing mechanism increasing the damping force when the piston assembly moves to the second chamber side;

a body valve assembly provided on a side of the second chamber opposite to the piston assembly; and a support member provided above the body valve assembly and configured to support the partition piston, wherein the damping force increasing mechanism includes:

a first cylinder connected to the one end portion side of the piston rod with respect to the piston assembly; and a partition piston entering an inside of the first cylinder to form a partition chamber in the first cylinder when the piston assembly moves to the second chamber side, wherein the support member is a second cylinder having a smaller diameter than the first cylinder, and wherein a communication passage through which air inside the second cylinder is allowed to flow is provided between the partition piston and the second cylinder.

2. The shock absorber according to claim 1, wherein the damping force increasing mechanism includes a valve assembly connected to the one end portion side of the piston rod with respect to the piston assembly, and the first cylinder is connected to the valve assembly.

3. The shock absorber according to claim 2, wherein the valve assembly includes:

a support piston connected to the one end portion side of the piston rod with respect to the piston assembly to support the first cylinder; and a plate-shaped relief valve provided on the support piston.

4. The shock absorber according to claim 1, wherein the partition piston includes:

a passage allowing communication between the second chamber and the partition chamber; and a movable member opening the passage when the piston assembly moves to the first chamber side and closing the passage when the piston assembly moves to the second chamber side.

\* \* \* \* \*